(12) United States Patent
Kumar et al.

(10) Patent No.: US 11,445,470 B2
(45) Date of Patent: Sep. 13, 2022

(54) POSITION MEASUREMENT IN PRESENCE OF MBSFN SIGNALS

(71) Applicant: QUALCOMM Incorporated, San Diego, CA (US)

(72) Inventors: Mukesh Kumar, Hyderabad (IN); Guttorm Ringstad Opshaug, Redwood City, CA (US); Siddhant, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 17/165,540

(22) Filed: Feb. 2, 2021

(65) Prior Publication Data

US 2022/0248367 A1 Aug. 4, 2022

(51) Int. Cl.
*H04W 72/04* (2009.01)
*H04W 64/00* (2009.01)
(Continued)

(52) U.S. Cl.
CPC ......... *H04W 64/006* (2013.01); *G01S 5/0236* (2013.01); *H04B 17/27* (2015.01);
(Continued)

(58) Field of Classification Search
None
See application file for complete search history.

(56) References Cited

U.S. PATENT DOCUMENTS 9,313,765 B2 4/2016 Lim et al.
10,117,217 B2 10/2018 Kim et al.
(Continued)

OTHER PUBLICATIONS

Fischer. S., "Observed Time Difference of Arrival (OTDOA) Positioning in 3GPP LTE", Qualcomm Technologies Inc, Jun. 6, 2014 (Jun. 6, 2014), XP055284784, pp. 1-62, Retrieved from the Internet: URL: https://www.qualcomm.com/media/documents/files/otdoa-positioning-in-3gpp-lte.pdf [retrieved on Jan. 30, 2019], p. 9, Chapter 3.1, p. 13, Chapter 4.2.1, p. 15, Chapter 5.1, p. 18, Chapter 5.4, pp. 31-33, Chapter 6.3, pp. 37-39, Chapter 6.5, pp. 40-42, Chapters 7.1.1-7.1.3, p. 14, p. 30, Paragraph 6.2 p. 31, Paragraph 6.3—p. 33, Paragraph 6.3 p. 40, Paragraph 7.1—p. 42, Paragraph 7.3 Figures 6-4, p. 12, section "4.1 Introduction", p. 31, section "6.3 LPP Procedures" p. 40, section "7.1 OTDOA Assistance Data Elements" figures 4-1, 6-3, Sections 5.2-5.3, 6.

(Continued)

*Primary Examiner* — Ajit Patel
(74) *Attorney, Agent, or Firm* — Weaver Austin Villeneuve & Sampson LLP

(57) ABSTRACT

In one example, a method comprises: receiving assistance data from a location server; classifying a plurality of candidate cells in the assistance data into a first group of candidate cells and a second group of candidate cells, wherein the classification is based on whether a candidate cell transmits position reference signal (PRS) symbols in one or more multimedia broadcast single frequency network (MBSFN) subframes in a positioning occasion, and based on a cyclic prefix (CP) length of the PRS symbols being transmitted by the candidate cell in the positioning occasion; selecting, based on one or more predetermined criteria, one of the first group or the second group of candidate cells to measure the one or more PRS in the positioning occasion; and measuring the one or more PRS from one of the first group or the second group of candidate cells in the positioning occasion to measure PRS measurements.

32 Claims, 23 Drawing Sheets

(51) Int. Cl.
*G01S 5/02* (2010.01)
*H04B 17/27* (2015.01)
*H04W 72/10* (2009.01)
*H04B 17/327* (2015.01)

(52) U.S. Cl.
CPC ...... *H04B 17/327* (2015.01); *H04W 72/0446* (2013.01); *H04W 72/10* (2013.01)

(56) References Cited

U.S. PATENT DOCUMENTS

| | | | | |
|---|---|---|---|---|
| 2013/0051317 A1* | 2/2013 | Ji | ............................ | H04L 5/0048 370/328 |
| 2013/0122930 A1* | 5/2013 | Woo | ....................... | H04W 64/00 455/456.1 |
| 2014/0295883 A1* | 10/2014 | Kang | ......................... | G01S 5/10 455/456.1 |
| 2015/0296359 A1* | 10/2015 | Edge | .......................... | G01S 1/20 455/404.2 |
| 2017/0238298 A1 | 8/2017 | Wang et al. | | |
| 2018/0217224 A1* | 8/2018 | Jain | ........................ | G01S 5/0221 |
| 2019/0257916 A1 | 8/2019 | Han et al. | | |
| 2019/0387494 A1 | 12/2019 | Lee et al. | | |
| 2020/0182959 A1 | 6/2020 | Markhovsky et al. | | |

OTHER PUBLICATIONS

International Search Report and Written Opinion—PCT/US2021/072635—ISA/EPO—dated Mar. 25, 2022.
Qualcomm Incorporated: "OTDOA Enhancements for the Shared Cell-ID Scenario", 3GPP Draft, 3GPP TSG-RAN WG3 Meeting #93, R3-161681_(OTDOA for Shared Cell-ID), 3rd Generation Partnership Project (3GPP), Mobile Competence Centre, 650, Route Des Lucioles, F-06921 Sophia-Antipolis Cedex, France, vol. RAN WG3, No. Gothenburg, Sweden, Aug. 22, 2016-Aug. 26, 2016, Aug. 21, 2016 (Aug. 21, 2016), XP051127520, pp. 1-5, Retrieved from the Internet: URL: http://www.3gpp.org/ftp/Meetings_3GPP_SYNC/RAN3/Docs/ [retrieved on Aug. 21, 2016] sections 1, 2.

* cited by examiner

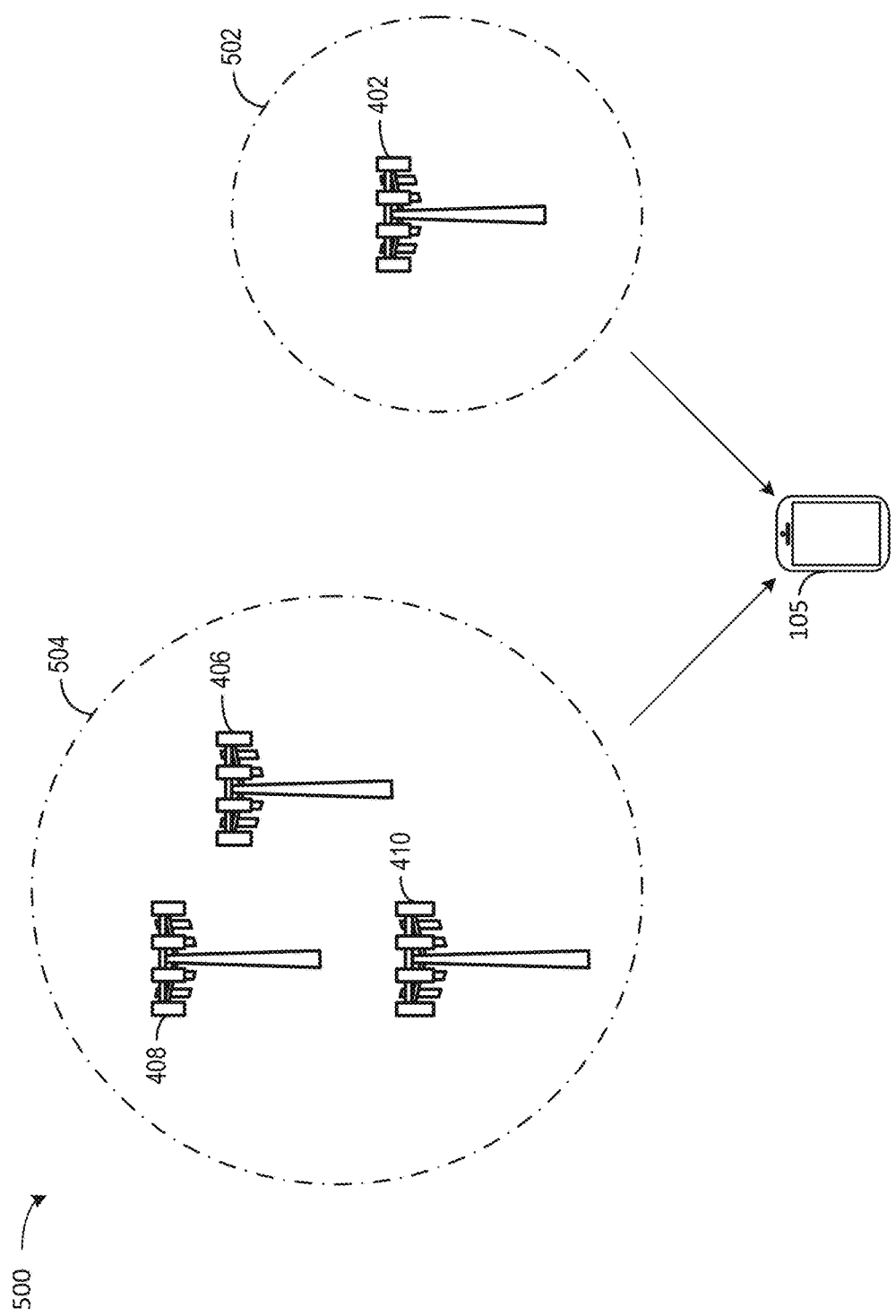

```
SystemInformationBlockType2 ::=    SEQUENCE {
    ac-BarringInfo                    SEQUENCE {
        ac-BarringForEmergency            BOOLEAN,
        ac-BarringForMO-signalling        AC-BarringConfig        OPTIONAL,  -- Need OP
        ac-BarringForMO-Data              AC-BarringConfig        OPTIONAL,  -- Need OP
        ac-BarringForMO-Data              AC-BarringConfig        OPTIONAL,  -- Need OP
    }
    radioResourceConfigCommon         RadioResourceConfigCommonSIB,
    ue-TimersAndConstants             UE-TimersAndConstants,
    freqInfo                          SEQUENCE {
        ul-CarrierFreq                    ARFCN-ValueEUTRA        OPTIONAL,  -- Need OP
        ul-Bandwidth                      ENUMERATED {n6, n15, n25, n50, n75, n100)
                                                                  OPTIONAL,  -- Need OP
    additionalSpectrumEmission        AdditionalSpectrumEmission
    ┌─────────────────────────────────────────────────────────┐
602─│ mbsfn-SubframeConfigList         MBSFN-SubframeConfigList OPTIONAL,  -- Need OR│
    └─────────────────────────────────────────────────────────┘
    timeAlignmentTimerCommon          TimeAlignmentTimer,
    ...,
    lateNonCriticalExtension          OCTET STRING (CONTAINING SystemInformationBlockType2-v8h0-IEs)
                                      OPTIONAL        -- Need OP
    [[ ssac-BarringForMMTEL-Voice-r9   AC-BarringConfig        OPTIONAL,  -- Need OP
       ssac-BarringForMMTEL-Video-r9   AC-BarringConfig        OPTIONAL,  -- Need OP
    ]],
    [[ ac-BarringForCSFB-r10           AC-BarringConfig        OPTIONAL   -- Need OP
    ]]
}
```

FIG. 6A

```
SystemInformationBlockType13-r9 ::=    SEQUENCE {
    mbsfn-AreaInfoList-r9           MBSFN-AreaInfoList-r9,
    notificationConfig-r9           MBMS-NotificationConfig-r9,
    lateNonCriticalExtension        OCTET STRING            OPTIONAL,  -- Need OP
    ...
}

MBSFN-AreaInfoList-r9 ::=    SEQUENCE (SIZE(1..maxMBSFN-Area)) OF MBSFN-AreaInfo-r9

MBSFN-AreaInfo-r9 ::=    SEQUENCE {
    mbsfn-AreaId-r9                 INTEGER (0..255),
    non-MBSFNregionLength           ENUMERATED (s1, s2),
    notificationIndicator-r9        INTEGER (0..7),
    mcch-Config-r9                  SEQUENCE {
        mcch-RepetitionPeriod-r9    ENUMERATED {rf32, rf64, rf128, rf256},
        mcch-Offset-r9              INTEGER (0..10),
        mcch-ModificationPeriod-r9  ENUMERATED {rf512, rf1024},
604 ⎯  sf-AllocInfo-r9             BIT STRING (SIZE(6)),
        signallingMCS-r9            ENUMERATED (n2, n7, n13, n19)
    },
    ...
}
```

FIG. 6B

```
OTDOA-ProvideAssistanceData ::= SEQUENCE {
    otdoa-ReferenceCellInfo         OTDOA-ReferenceCellInfo        ─612
    otdoa-NeighbourCellInfo         OTDOA-NeighbourCellInfoList    ─614
    otdoa-Error                     OTDOA-Error
    ...
}
```

FIG. 6C

```
OTDOA-ReferenceCellInfo ::= SEQUENCE {
    physCellId              INTEGER (0..503),
    cellGlobalId            ECGI                                            OPTIONAL,
    earfcnRef               ARFCN-ValueEUTRA                                OPTIONAL,
    antennaPortConfig       ENUMERATED (ports1-or-2, ports4,...)            OPTIONAL,
    cpLength                ENUMERATED ( normal, extended,...),              ⎫ 616
    prsInfo                 PRS-Info                                OPTIONAL,⎭ 618
    ...
}
```

```
PRS-Info ::= SEQUENCE {
    prs-Bandwidth              ENUMERATED { n6, n15, n25, n50, n75, n100,...},
    prs-ConfigurationIndex     INTEGER (0..4095),                              ⎫ 620
    numDL-Frames               ENUMERATED {sf-1, sf-2, sf-4, sf-6,...},        ⎭ 622
    ...,
    prs-MutingInfo-r9          CHOICE {
        po2-r9                 BIT STRING (SIZE(2)),
        po4-r9                 BIT STRING (SIZE(4)),
        po8-r9                 BIT STRING (SIZE(8)),
        po16-r9                BIT STRING (SIZE(16)),
        ...
    }                                                                      OPTIONAL  -- Need OP
}
```

FIG. 6D

```
OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement    -- 615

OTDOA-NeighbourCellInfoElement ::= SEQUENCE (
    physCellId                  INTEGER (0..503),
    cellGlobalId                ECGI                                        OPTIONAL,   -- Need ON
    earfcn                      ARFCN-ValueEUTRA                            OPTIONAL,
    cpLength                    ENUMERATED {normal, extended, ...}          OPTIONAL,   -- 616
    prsInfo                     PRS-Info                                    OPTIONAL,   -- 618
    antennaPortConfig           ENUMERATED {ports-1-or-2, ports-4,          OPTIONAL,
    slotNumberOffset            INTEGER (0..19)                             OPTIONAL,
    prs-SubframeOffset          INTEGER (0..1279)                           OPTIONAL,
    expectedRSTD                INTEGER (0..16383),
    expectedRSTD-Uncertainty    INTEGER (0..1023),
    ...
}
```

FIG. 6E

| PRS subframe numbers | MBSFN subframe numbers | CP length | Cell Group |
|---|---|---|---|
| Cell A | 0, 1, 2 | 1, 2, 3 | NCP | 504 |
| Cell B | 1, 2 | N/A | NCP | 504 |
| Cell C | 0, 1, 2, 3, 4, 5 | 1, 2, 3 | NCP | 504 |
| Cell D | 1 | 1, 2, 3 | ECP | 502 |

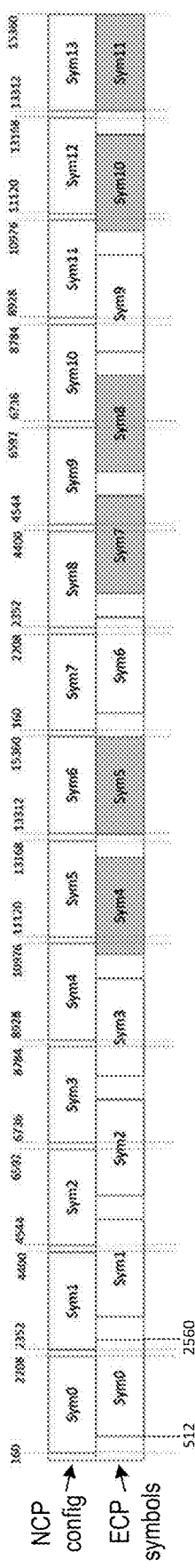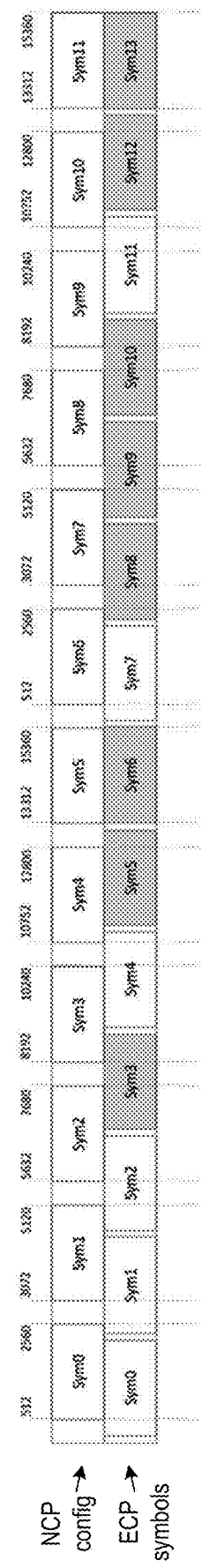
FIG. 7C

POSITION MEASUREMENT IN PRESENCE OF MBSFN SIGNALS

BACKGROUND

Field

The subject matter disclosed herein relates to electronic devices, and more particularly to methods and apparatuses for use to support location determination of a mobile device using a wireless network.

Information

Obtaining the location or position of a mobile device that is accessing a wireless network may be useful for many applications including, for example, emergency calls, personal navigation, asset tracking, locating a friend or family member, etc. Existing position methods include methods based on measuring the timing of radio signals received from a variety of devices including, for example, satellite vehicles (SVs), terrestrial radio sources (e.g., a base station), etc. in a multiple-access wireless network. Examples of such multiple-access networks include Code Division Multiple Access (CDMA) networks, Time Division Multiple Access (TDMA) networks, Frequency Division Multiple Access (FDMA) networks, etc. FDMA networks may include, for example, Orthogonal FDMA (OFDMA) networks, Single-Carrier FDMA (SC-FDMA) networks, etc.

In a FDMA wireless network, radio signals may be transmitted using multiple subcarriers of different frequency bands. A base station may be allocated a plurality of subcarriers as available wireless resources to perform the transmission of radio signals. With current technologies, the base station may use some, but not all, of the allocated subcarriers to transmit position measurement radio signals.

It is expected that standardization for new fifth-generation (5G) wireless networks will include support for various positioning methods both new and existing, but issues may arise with the current method of transmission of position measurement signals which can be transmitted with other signals, such as signals of a Multimedia Broadcast multicast service Single Frequency Network (MBSFN), which can lead to inaccurate position measurements. Techniques disclosed herein address these issues by implementing techniques that improve the accuracy of detecting position measurement signals in 5G wireless networks, as well as in legacy wireless networks such as Long Term Evolution (LTE) networks.

BRIEF SUMMARY

An example of user equipment (UE) for performing position measurement in a wireless communication network, according to the description, comprises: memory; a wireless communication interface; and a processing unit, communicatively coupled to the memory and the wireless communication interface, the processing unit configured to: receive assistance data from a location server, wherein the assistance data identify a plurality of candidate cells with which the UE can measure one or more position reference signals (PRS) to support a position measurement operation of the UE; classify the plurality of candidate cells into a first group of candidate cells and a second group of candidate cells, wherein the classification is based on whether a candidate cell transmits PRS symbols in one or more multimedia broadcast single frequency network (MBSFN) subframes in a positioning occasion, and based on a cyclic prefix (CP) length of the PRS symbols being transmitted by the candidate cell in the positioning occasion; select, based on one or more predetermined criteria, one of the first group or the second group of candidate cells to measure the one or more PRS in the positioning occasion; and measure the one or more PRS from the selected one of the first group or the second group of candidate cells in the positioning occasion to measure PRS measurements.

An example of a method on a UE for performing position measurement in a wireless communication network, according to the description, comprises: receiving assistance data from a location server, wherein the assistance data identify a plurality of candidate cells with which the UE can measure one or more PRSs to support a position measurement operation of the UE; classifying the plurality of candidate cells into a first group of candidate cells and a second group of candidate cells, wherein the classification is based on whether a candidate cell transmits PRS symbols in one or more multimedia broadcast single frequency network (MBSFN) subframes in a positioning occasion, and based on a CP length of the PRS symbols being transmitted by the candidate cell in the positioning occasion; selecting, based on one or more predetermined criteria, one of the first group or the second group of candidate cells to measure the one or more PRS in the positioning occasion; and measuring the one or more PRS from the selected one of the first group or the second group of candidate cells in the positioning occasion to measure PRS measurements.

An example of an apparatus being part of a UE for performing position measurement in a wireless communication network, according to the description, comprises: means for receiving assistance data from a location server, wherein the assistance data identify a plurality of candidate cells with which the UE can measure one or more PRSs to support a position measurement operation of the UE; means for classifying the plurality of candidate cells into a first group of candidate cells and a second group of candidate cells, wherein the classification is based on whether a candidate cell transmits PRS symbols in one or more multimedia broadcast single frequency network (MBSFN) subframes in a positioning occasion, and based on a CP length of the PRS symbols being transmitted by the candidate cell in the positioning occasion; means for selecting, based on one or more predetermined criteria, one of the first group or the second group of candidate cells to measure the one or more PRS in the positioning occasion; and means for measuring the one or more PRS from the selected one of the first group or the second group of candidate cells in the positioning occasion to measure PRS measurements.

According to the description, an example of a non-transitory computer readable comprising instructions that, when executed by a processor, cause the processor to: receive assistance data from a location server, wherein the assistance data identify a plurality of candidate cells with which the UE can measure one or more position reference signals (PRS) to support a position measurement operation of the UE; classify the plurality of candidate cells into a first group of candidate cells and a second group of candidate cells, wherein the classification is based on whether a candidate cell transmits PRS symbols in one or more multimedia broadcast single frequency network (MBSFN) subframes in a positioning occasion, and based on a cyclic prefix (CP) length of the PRS symbols being transmitted by the candidate cell in the positioning occasion; select, based on one or more predetermined criteria, one of the first group or the second group of candidate cells to measure the one or more PRS in the positioning occasion; and measure the one or more PRS from the selected one of the first group or the second group of candidate cells in the positioning occasion to measure PRS measurements.

BRIEF DESCRIPTION OF DRAWINGS

Non-limiting and non-exhaustive aspects are described with reference to the following figures.

FIG. 5 illustrates an example position determination operation between a UE and cells in and out of a MBSFN area, according to examples of the present disclosure.

FIGS. 6A-6F illustrate example information elements that support the example position determination operation of FIG. 5, according to examples of the present disclosure.

FIGS. 7A-7C illustrate example operations that are part of the example position determination operation of FIG. 5, according to examples of the present disclosure.

FIG. 8 is a flow diagram illustrating a method of locating a UE at the UE, according to examples of the present disclosure.

Figure 1:
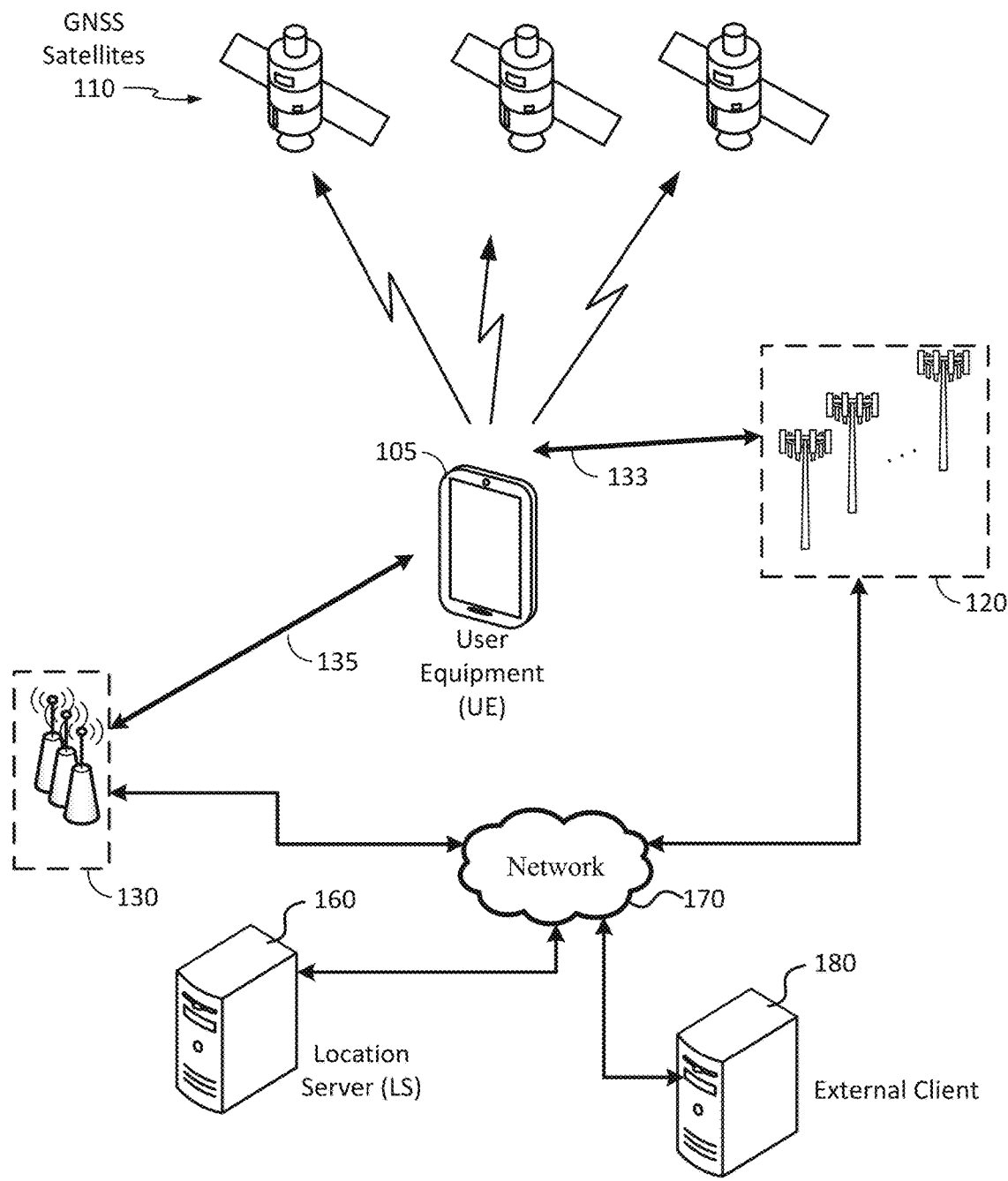
FIG. 1 is a diagram of a communication system that may utilize a 5G network to determine a position of a UE, according to examples of the present disclosure.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3, etc. When referring to such an element using only the first number, any instance of the element is to be understood (e.g., elements 110 in the previous example would refer to elements 110-1, 110-2, and 110-3).

DETAILED DESCRIPTION

Some example techniques for determining the location of a user equipment (UE) are presented herein, which may be implemented at the UE (e.g., a mobile device or mobile station), a location server (LS), a base station, and/or other devices. These techniques can be utilized in a variety of applications utilizing various technologies and/or standards, including 3rd Generation Partnership Project (3GPP), Open Mobile Alliance (OMA), Long Term Evolution (LTE), Positioning Protocol (LPP) and/or LPP Extensions (LPPe), Wi-Fi®, Global Navigation Satellite System (GNSS), and the like.

A UE may comprise a mobile device such as, for example, a mobile phone, smartphone, tablet or other mobile computer, a portable gaming device, a personal media player, a personal navigation device, a wearable device, an in-vehicle device, or other electronic device. Position determination of a UE can be useful to the UE and/or other entities in a wide variety of scenarios. There are many methods already known to determine an estimated position of the UE, including methods that involve communicating measurement and/or other information between the UE and an LS.

Fifth-generation (5G) standardization includes support for positioning methods based on or similar to Observed Time Difference Of Arrival (OTDOA) which is used in LTE network. Examples of positioning methods supported in 5G network include, for example, OTDOA, uplink time of arrival (ULTOA), downlink time of arrival (DLTOA), multi-cell round trip time (RTT), etc. With OTDOA, a UE measures time differences, referred to as Reference Signal Time Differences (RSTDs), between reference signals transmitted by one or more pairs of base stations. The reference signals may be signals that are intended only for navigation and positioning which may be referred to as Positioning Reference Signals (PRS) or may be signals intended also for serving cell timing and frequency acquisition which may be referred to as Cell-specific Reference Signals (CRS), Tracking Reference Signals (TRS), Channel State Information reference signal (CSI-RS), Primary and Secondary Synchronization Sequences (PSS/SSS), or Physical Broadcast Channel (PBCH) signals. A UE is able to measure two or more RSTDs between two or more different pairs of base stations (or at least three cells). Each pair of neighbor base stations typically includes a common reference base station. The horizontal UE location can be obtained if the antenna locations and the relative timing of the base stations are known.

In addition to supporting positioning methods, a wireless communication network, such as 3GPP and 5G network, can be used to transmit different types of data, such as communication data, multimedia data, etc. The data can be transmitted in different types of transmission operations, such as a unicast operation, a broadcast operation, etc. In an unicast operation, each base station is controlled so as to transmit signals carrying information directed to a subscriber UE. The specificity of unicast signaling enables person-to-person services such as, for example, voice calling, text messaging, or video calling. In a broadcast operation, several base stations in a broadcast area are controlled to broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) including, for example, multimedia broadcast single frequency network (MBSFN) in the LTE context, can utilize such SFN operation. SFNs utilize radio transmitters, such as base stations, to communicate with subscriber UEs.

In the wireless communication network, a base station can transmit a set of radio signals across a range of time intervals to form a radio frame, which comprises multiple subframes, and each subframe can include multiple transmission time slots. A radio signal, such as an MBMS signal, a PRS signal, etc., can include a predetermined number of symbols transmitted in multiple transmission time slots within a subframe. A PRS can be transmitted in special positioning subframes that are grouped into a positioning occasion. The duration of a symbol, which determines a number of symbols in a transmission time slot, can be based on a cyclic prefix arrangement, in which part of the symbol is duplicated to reduce inter symbol interference (ISI) due to the multipath effect. In 3GPP and 5G networks, symbols of radio signals that are to be transmitted over a longer range, such as MBMS signals, can include an extended cyclic prefix (ECP) which increases the symbol duration and reduces the number of symbols in a transmission time slot, compared with a normal cyclic prefix (NCP) arrangement. Other signals, such as PRS signals, can include either ECP or NCP in the symbols, depending on a range of transmission of the signals. Symbols having different cyclic prefixes require different digital signal processing configurations to recover the symbols from the radio signals. But due to hardware capability, as well as memory and power limitation, a UE can only use a single digital signal processing configuration (ECP or NCP) to recover the symbols from the radio signals.

A base station that is part of a MBSFN can transmit both MBMS and PRS signals. The base station may transmit MBMS to support a broadcast operation and may also transmit PRS to support a position determination operation at the UE. In such cases, the base station may transmit PRS symbols in radio subframes that also include MBMS symbols (herein after, "MBSFN subframes"). In certain scenarios, in a positioning occasion, the base station may transmit PRS symbols entirely in MBSFN subframes in a radio frame, and the PRS symbols in a MBSFN subframe may include a mixture of symbols having NCP and symbols having ECP. On the other hand, a cell that transmits PRS symbols with non-MBSFN subframes may transmit PRS symbols having only NCP, or PRS symbols having the same cyclic prefix as subframe zero of a radio frame.

With current technologies, a UE will always measure PRS with MBSFN cells which transmit both PRS and MBMS. If those cells transmit the PRS symbols using only the MBSFN subframes in a positioning occasion, the UE may adopt the signal processing configurations for symbols having ECP to recover the PRS symbols, and to measure the PRS based on the recovered symbol in that positioning occasion. But since the PRS symbols include a mixture of NCP and ECP symbols, such arrangements can lead to errors in the recovery of the PRS symbols, which can lead to inaccurate position determination. In addition, as the UE adopts the signal processing configurations for symbols having ECP to recover the PRS symbols from the MBSFN cells, the UE may be unable to measure PRS with other cells that transmit PRS symbols having NCP in non-MBSFN subframes in a given positioning occasion, such as non-MBSFN cells. Those cells may be more numerous than cells of the MBSFN. The lack of PRS measurements with other cells prevents the UE from further refining the position determination based on PRS measurement with other cells, which can further degrade the accuracy of the position determination operation.

Techniques described herein below can address these issues to improve positioning methods in a wireless network. Specifically, a mobile device, such as an user equipment, can receive assistance data from a location server. The assistance data can identify a plurality of candidate cells with which the UE can measure one or more position reference signals (PRS) to support a position determination operation of the UE. The mobile device can classify the plurality of candidate cells into a first group of candidate cells and a second group of candidate cells based on whether a cell transmits PRS symbols in MBSFN subframes in a positioning occasion, and based on a CP length (ECP or NCP) of the PRS symbols being transmitted by the cell in that positioning occasion. The UE can select, based on one or more predetermined criteria, one of the first group or the second group of candidate cells to measure PRS. The UE can then measure the PRS with the selected one of the first group or the second group of candidate cells to measure the PRS measurements, and determine a position of the UE based on the PRS measurements.

There are various ways by which the UE can classify the cells into the first group and the second group of candidate cells. In some examples, the first group of candidate cells may include cells that transmit PRS symbols only in MBSFN subframes, and the PRS symbols may include ECP, or a mixture of ECP and NCP. The second group of candidate cells may include cells that transmit PRS symbols in NCP, including cells that belong to the MBSFN but transmits PRS symbols in a mixture of MBSFN subframes and non-MBSFN subframe (e.g., subframe zero) in a positioning occasion, as well as cells that do not belong to the MBSFN, and hence, transmit PRS symbols in non-MBSFN subframe in the positioning occasion.

The UE can obtain the MBSFN subframe and PRS subframe information, as well as the CP length of the PRS symbols, from various sources. In one example, the UE may receive system broadcast messages, such as System Information Block Type 2 (SIB2) and System Information Block Type 13 (SIB13) messages, and can obtain MBSFN configuration information from those messages. The messages can identify, based on subframe numbers, the MBSFN subframes used to carry MBMS symbols, the MBSFN subframes used to carry Multicast control channel (MCCH) control data, etc., output by the cells that are part of MBSFN. In addition, the assistance data can also identify the PBS subframes that carry PBS symbols, as well as the CP length of the PBS symbols. The UE can compare the subframe numbers of the MBSFN subframes (if any) and the PBS subframes for each candidate cell, and determine whether a candidate cell transmits PBS symbols using entirely MBSFN subframes, or whether a candidate cell transmits PBS symbols using non-MBSFN subframes. The UE can also obtain the CP length (ECP or NCP) of the PBS symbols from the assistance data. Based on these information, the UE can classify each candidate cell into one of the first group or the second group. In another example, the UE may also receive the PBS and MBSFN subframe information for each candidate cell, and classify each candidate cell based on the subframe information included in the assistance data.

The UE can then select, based on one or more predetermined criteria, a candidate cell group (one of the first group or the second group) to measure the PRS in a positioning occasion. In one example, the UE may determine one or more performance metrics of PRS measurements for the first group and the second group of candidate cell, and can select the group that provides the better performance metric. One performance metric can be based on the reliability of PRS measurements with the candidate cells. In one example, the assistance data identify a reference cell and a list of neighboring cells. An RSTD can be determined based on a timing difference between the PRS signal received from the reference cell, which serves a reference, and the PRS signals received from a neighboring cell. The neighboring cells listed in the assistance data can include the candidate cells from which the UE can choose to measure the RSTD in combination with the reference cell. In the assistance data, the neighboring cells can be listed and sorted in a decreasing order of priority for measurements. A neighboring cell listed as a higher priority cell (based on the order of the cells in the list) in the assistance data may reflect that PRS measurement with that cell is more reliable, hence there is a higher priority to measure the PRS with that cell, compared with a neighboring cell listed as a lower priority cell. The UE can determine an overall priority of the cells for each candidate cell group based on, for example, computing an average order of the cells in the list for each candidate cell group, and can select the candidate cell group having a higher overall priority to measure the PRS.

In another example, the performance metric can be based on measuring a quality of signal received from the cells. Specifically, the signal quality can be measured based on, for example, reference signal receive power (RSRP), received signal strength indication (RSSI), etc. The UE can determine an overall signal quality of the cells for each candidate cell group based on, for example, computing an average RSRP/RSSI measurement result for each candidate cell group, and can select the candidate cell group that provides a higher overall signal quality to measure the PRS.

In some examples, the UE can also perform the selection of the candidate cell group following a multi-stage approach. In a first stage, the UE can select between the first group and the second group based on the overall priority in each group. The UE can then determine whether measuring the PRS with the selected group may lead to a less accurate position determination than with the non-selected group. The determination can be based on, for example, the selected group including far fewer cells than the non-selected group, and therefore providing fewer RSTD results to refine the location determination result. If the UE determines, based on the overall priority, that the PRS measurements with the group selected may lead to a less accurate position determination than with the non-selected group, the UE can measure the signal quality of PRS (e.g., RSSI, RSRP.) with the cells in both groups, and select the group which provides the higher overall signal quality. The group selected based on the higher overall signal quality may be the same or different from the group selected based on the higher overall priority, and the group selection based on overall signal quality can overrule the group selection based on overall priority.

In some examples, the UE may determine that the group selection at the end of the two-stage approach (based on overall priority, and then based on overall signal quality), does not identify a cell group that improves the location determination versus that other cell group. In such case, the UE may measure PRS alternately between the first cell group and the second cell group in each positioning occasion. In such a case, the selection of one cell group to measure the PRS in one positioning occasion will be based on that cell group not being selected in a prior positioning occasion.

In some examples, the UE may apply a digital signal processing configuration for one type of cyclic prefix (ECP or NCP) to recover symbols of a different type of cyclic prefix. For example, the UE may apply a digital signal processing for NCP to recover symbols having ECP, or vice versa. The UE can allow a mismatch between the digital signal processing configuration and the cyclic prefix of the symbols to be recovered when, for example, the UE measures the PRS with both selected and non-selected cell group within a positioning occasion to increase the sources for measuring the RSTD, which can improve the accuracy of the position determination operation. The UE can adopt the digital signal processing configuration for a predetermined cyclic prefix (e.g., NCP) used by the selected cell group and use that configuration to recover PRS symbols having that cyclic prefix from the selected cell group within the positioning occasion. The UE can also use that configuration to recover PRS symbols having a different cyclic prefix (e.g., ECP) from the non-selected cell group within the positioning occasion. The UE may also assign a different weight to the PRS measurements for each of the selected cell group and non-selected cell group, with a larger weight assigned to the selected cell group. The weight assigned to the non-selected cell group can be adjusted based on a predicted symbol recovery error and can be increased for a lower symbol recovery error.

With the disclosed techniques, a UE can select a candidate cell group to measure the PRS based on performance metrics (e.g., overall priority of measurements, overall signal quality), which can improve accuracies of the PRS measurements and the resulting position determination operation. Through the selection process the UE can also select a fewer number of cells which can offer more accurate PRS measurements, which can reduce the power consumption of the PRS measurements and position determination operations at the UE. All these can improve the performance of the UE.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

As used herein, an "RF signal," or "radio signals," comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 is a simplified illustration of a positioning system 100 in which a UE 105, location server (LS) 160, and/or other components of the positioning system 100 can use the techniques provided herein for determining and estimated location of UE 105, according to an embodiment. The techniques described herein may be implemented by one or more components of the positioning system 100. The positioning system 100 can include a UE 105, one or more satellites 110 for a Global Navigation Satellite System (GNSS) such as the Global Positioning System (GPS) (also referred to as GNSS space vehicles (SVs)), base stations 120, access points (APs) 130, LS 160, network 170, and external client 180.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Particular examples of network 170 include a Long Term Evolution (LTE) wireless network, a Fifth Generation (5G) wireless network (also referred to as New Radio (NR) wireless network), a Wi-Fi wireless local area network (WLAN), and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that network 170 is a 5G network. An AP 130 may comprise a Wi-Fi AP or a Bluetooth® AP, for example. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for 5G or NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g., data transported using the Internet Protocol (IP) and/or Transmission Control Protocol (TCP)) from the perspective of network 170.

An estimated location of UE 105 can be used in a variety of applications—e.g., to assist direction finding or navigation for a user of UE 105 or to assist another user (e.g., associated with external client 180) to locate UE 105. A "location" is also referred to herein as a "location estimate," "estimated location," "location," "position," "position estimate," "position fix," "estimated position," "location fix," or "fix." A location of UE 105 may comprise an absolute location of UE 105 (e.g., a latitude and longitude and possibly altitude) or a relative location of UE 105 (e.g., a location expressed as distances north or south, east or west and possibly above or below some other known fixed location or some other location such as a location for UE 105 at some known previous time). A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., 95% confidence).

The external client 180 may be a web server or remote application that may have some association with UE 105 (e.g., may be accessed by a user of UE 105) or may be a server, application, or computer system providing a location service to some other user or users which may include obtaining and providing the location of UE 105 (e.g., to enable a service such as friend or relative finder, asset tracking or child or pet location). Additionally or alternatively, the external client 180 may obtain and provide the location of UE 105 to an emergency services provider, government agency, etc.

Figure 2:
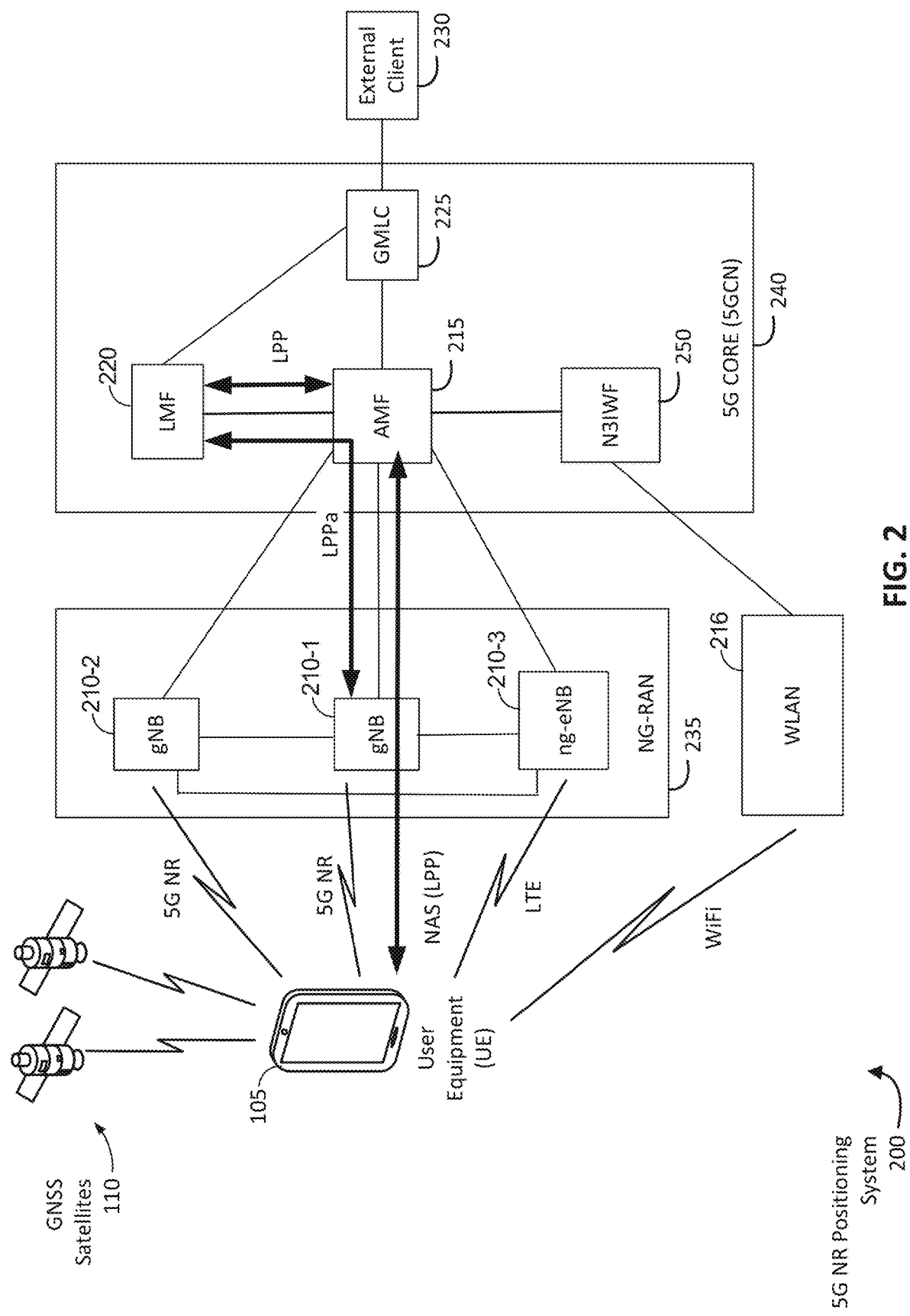
FIG. 2 is a diagram of a 5G NR positioning system, according to examples of the present disclosure.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 200) implementing 5G NR. The 5G NR positioning system 200 may be configured to determine the location of a UE 105 by using access nodes 210 and 216 (which may correspond with base stations 120 and access points 130 of FIG. 1) and (optionally) an LMF 220 (which may correspond with LS 160) to implement one or more positioning methods. Here, the 5G NR positioning system 200 comprises a UE 105, and components 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions) may utilize the 5G NR positioning system 200. Similarly, the 5G NR positioning system 200 may include a larger (or smaller) number of GNSS satellites 110, access node 210 (which includes gNBs 210-1 and 210-2 and ng-eNBs 210-3), Wireless Local Area Networks (WLANs) 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225).

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%). A location of the UE 105 may further be a relative location comprising, for example, a distance and direction or relative X, Y (and Z) coordinates defined relative to some origin at a known position which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude and altitude above or below mean sea level).

Base stations in the NG-RAN 235 shown in FIG. 2 may correspond to base stations 120 in FIG. 1 and comprise a Transmission Reception Point (TRP), and may include NR NodeB (gNB) 210-1 and 210-2 (collectively and generically referred to herein as gNBs 210) and/or an antenna of a gNB. Pairs of gNBs 210 in NG-RAN 235 may be connected to one another—e.g., directly as shown in FIG. 2 or indirectly via other gNBs 210. Access to the 5G network is provided to UE 105 via wireless communication between the UE 105 and one or more of the access nodes/gNBs 210, which may provide wireless communications access to the 5G CN 240 on behalf of the UE 105 using 5G NR. 5G NR radio access may also be referred to as NR radio access or as 5G radio access. In FIG. 2, the serving gNB for UE 105 is assumed to be gNB 210-1, although other gNBs (e.g., gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 210-3. Ng-eNB 210-3 may be connected to one or more gNBs 210 in NG-RAN 235—e.g., directly or indirectly via other gNBs 210 and/or other ng-eNBs. An ng-eNB 210-3 may provide LTE wireless access and/or evolved LTE (eLTE) wireless access to UE 105. Some gNBs 210 (e.g., gNB 210-2) and/or ng-eNB 210-3 in FIG. 2 may be configured to function as positioning-only beacons which may transmit signals (e.g., PRS signals) and/or may broadcast assistance data to assist positioning of UE 105 but may not receive signals from UE 105 or from other UEs. It is noted that while only one ng-eNB 210-3 is shown in FIG. 2, some embodiments may include multiple ng-eNBs 210-3.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi access points (APs). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink and downlink control plane Non-Access Stratum (NAS) signaling between UE 105 and AMF 215 across an N1 interface. In some other embodiments, WLAN 216 may connect directly to elements in 5G CN 240 (e.g., AMF 215 as shown by the dashed line in FIG. 2) and not via N3IWF 250—e.g., if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 210-3, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 210-3, or WLAN 216.

In some embodiments, an access node, such as a gNB 210, ng-eNB 210-3, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 105), and/or obtain measurements from the UE 105 that are transferred to the access node using one or more of the multiple RATs. As noted, while FIG. 2 depicts access nodes 210 and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may comprise an E-UTRAN plus an EPC, where the E-UTRAN corresponds to NG-RAN 235 and the EPC corresponds to 5G CN 240 in FIG. 2. The methods and techniques described herein for UE 105 positioning using common or generic positioning procedures may be applicable to such other networks.

The gNBs 210 and ng-eNB 210-3 can communicate with an AMF 215, which, for positioning functionality, communicates with an LMF 220. The AMF 215 may support mobility of the UE 105, including cell change and handover of UE 105 from an access node (e.g., gNBs 210 and/or WLAN 216) of a first RAT to an access node (e.g., gNBs 210 and/or WLAN 216) of a second RAT. The AMF 215 may also participate in supporting a signaling connection to the UE 105 and possibly data and voice bearers for the UE 105. The LMF 220 may support positioning of the UE 105 when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA), Real Time Kinematics (RTK), Precise Point Positioning (PPP), Differential GNSS (DGNSS), ECID, angle of arrival (AOA), angle of departure (AOD), WLAN positioning, and/or other positioning procedures and methods. The LMF 220 may also process location services requests for the UE 105, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 105 (e.g., by processing downlink PRS (DL-PRS) signals transmitted by wireless nodes such as gNBs 210, ng-eNB 210-3, and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220, or may forward the location request directly to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 210-3 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 210-3 and the LMF 220, via the AMF 215. As further illustrated in FIG. 2, LMF 220 and UE 105 may communicate using the LPP protocol. LMF 220 and UE 105 may also or instead communicate using an LPP protocol (which, in NR, also may be referred to as NRPP or NPP). Here, LPP messages may be transferred between the UE 105 and the LMF 220 via the AMF 215 and a serving gNB 210-1 or serving ng-eNB 210-3 for UE 105. For example, LPP and/or LPP messages may be transferred between the LMF 220 and the AMF 215 using messages for service based operations (e.g., based on the Hypertext Transfer Protocol (HTTP)) and may be transferred between the AMF 215 and the UE 105 using a 5G NAS protocol. The LPP and/or LPP protocol may be used to support positioning of UE 105 using UE assisted and/or UE based position methods such as A-GNSS, RTK, OTDOA and/or Enhanced Cell ID (ECID). The LPPa protocol may be used to support positioning of UE 105 using network based position methods such as ECID (e.g., when used with measurements obtained by a gNB 210 or ng-eNB 210-3) and/or may be used by LMF 220 to obtain location related information from gNBs 210 and/or ng-eNB 210-3, such as parameters defining DL-PRS transmission from gNBs 210 and/or ng-eNB 210-3.

In the case of UE 105 access to WLAN 216, LMF 220 may use LPPa and/or LPP to obtain a location of UE 105 in a similar manner to that just described for UE 105 access to a gNB 210 or ng-eNB 210-3. Thus, LPPa messages may be transferred between a WLAN 216 and the LMF 220, via the AMF 215 and N3IWF 250 to support network based positioning of UE 105 and/or transfer of other location information from WLAN 216 to LMF 220. Alternatively, LPPa messages may be transferred between N3IWF 250 and the LMF 220, via the AMF 215, to support network based positioning of UE 105 based on location related information and/or location measurements known to or accessible to N3IWF 250 and transferred from N3IWF 250 to LMF 220 using LPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

With a UE-assisted position method, UE 105 may obtain location measurements and send the measurements to a location server (e.g., LMF 220) for computation of a location estimate for UE 105. Location measurements may include one or more of a Received Signal Strength Indication (RSSI), Round Trip Signal Propagation Time (RTT), Reference Signal Received Quality (RSRQ), Time of Arrival (TOA), Angle of Arrival (AOA), Differential AoA (DAOA), Angle of Departure (AOD), or Timing Advance (TA) for gNBs 210, ng-eNB 210-3, and/or one or more access points for WLAN 216. The location measurements may also or instead include measurements of RAT-independent positioning methods such as GNSS (e.g., GNSS pseudorange, GNSS code phase, and/or GNSS carrier phase for SVs 290) WLAN, etc. With a UE based position method, UE 105 may obtain location measurements (e.g., which may be the same as or similar to location measurements for a UE-assisted position method) and may further compute a location of UE 105 (e.g., with the help of assistance data received from a location server such as LMF 220 or broadcast by gNBs 210, ng-eNB 210-3, or WLAN 216). With a network based position method, one or more base stations (e.g., gNBs 210 and/or ng-eNB 210-3), one or more APs (e.g., in WLAN 216), or N3IWF 250 may obtain location measurements (e.g., measurements of RSSI, RTT, RSRP, RSRQ, AoA, or ToA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

In addition to supporting positioning methods, the LTE and 5G NR network can be used to transmit different types of data, such as communication data, multimedia data, etc. The data can be transmitted in different types of transmission operations, such as a unicast operation, a broadcast operation, etc. In an unicast operation, each base station is controlled so as to transmit signals carrying information directed to a subscriber UE. The specificity of unicast signaling enables person-to-person services such as, for example, voice calling, text messaging, or video calling. In a broadcast operation, several base stations in a broadcast area are controlled to broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) including, for example, multimedia broadcast single frequency network (MBSFN) in the LTE context, can utilize such SFN operation. SFNs utilize radio transmitters, such as base stations, to communicate with subscriber UEs. Multiple base stations that belong to an MBSFN can be controlled to broadcast signals carrying MBMS data, and the cells of the base stations can form a MBSFN area. A subscriber UE located in the MBSFN area can receive the broadcast signal to provide the broadcasted content to a user.

Figure 3A:
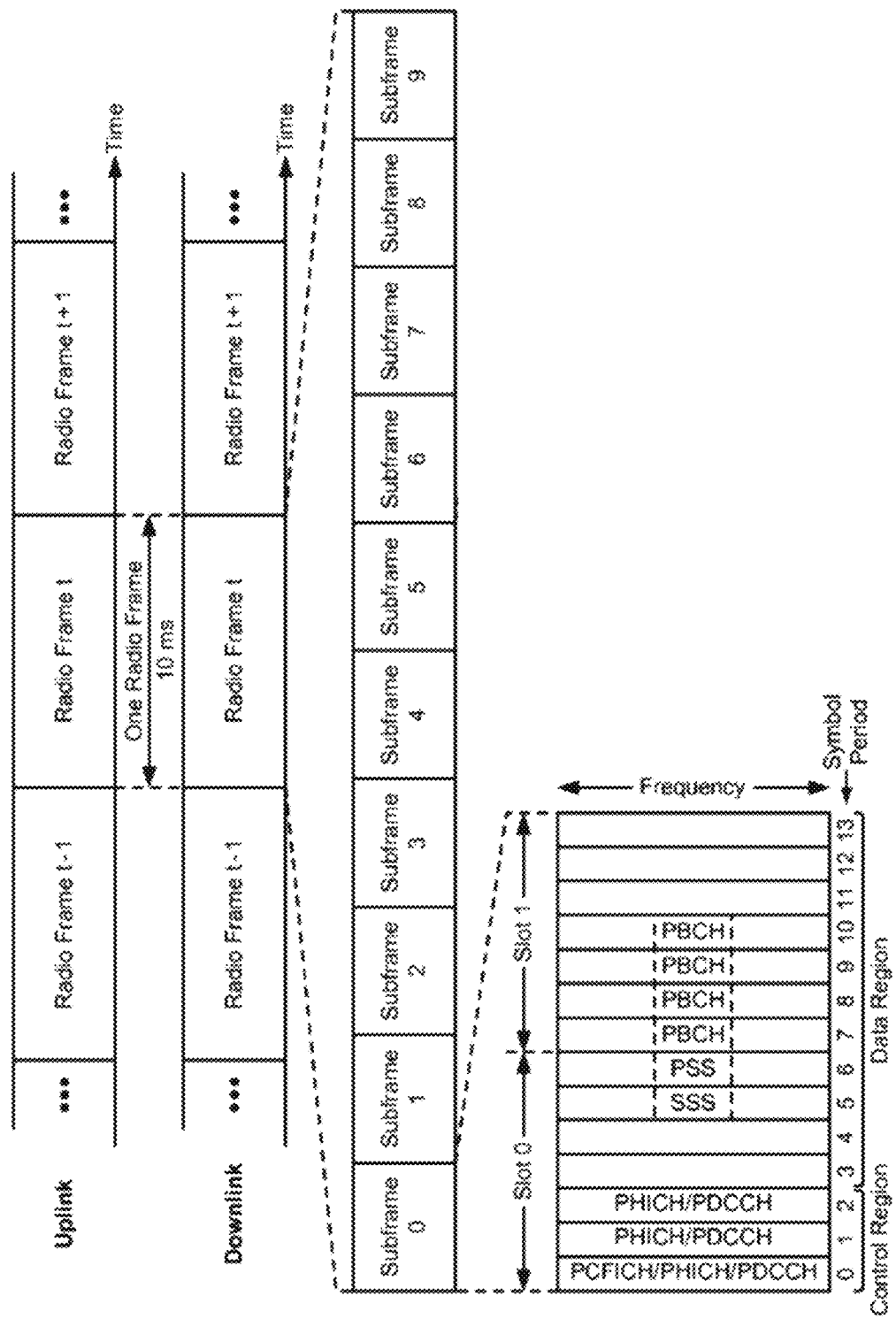
FIGS. 3A-3E illustrate example radio frame structures in a wireless communication network, according to examples of the present disclosure.
Figure 3B:
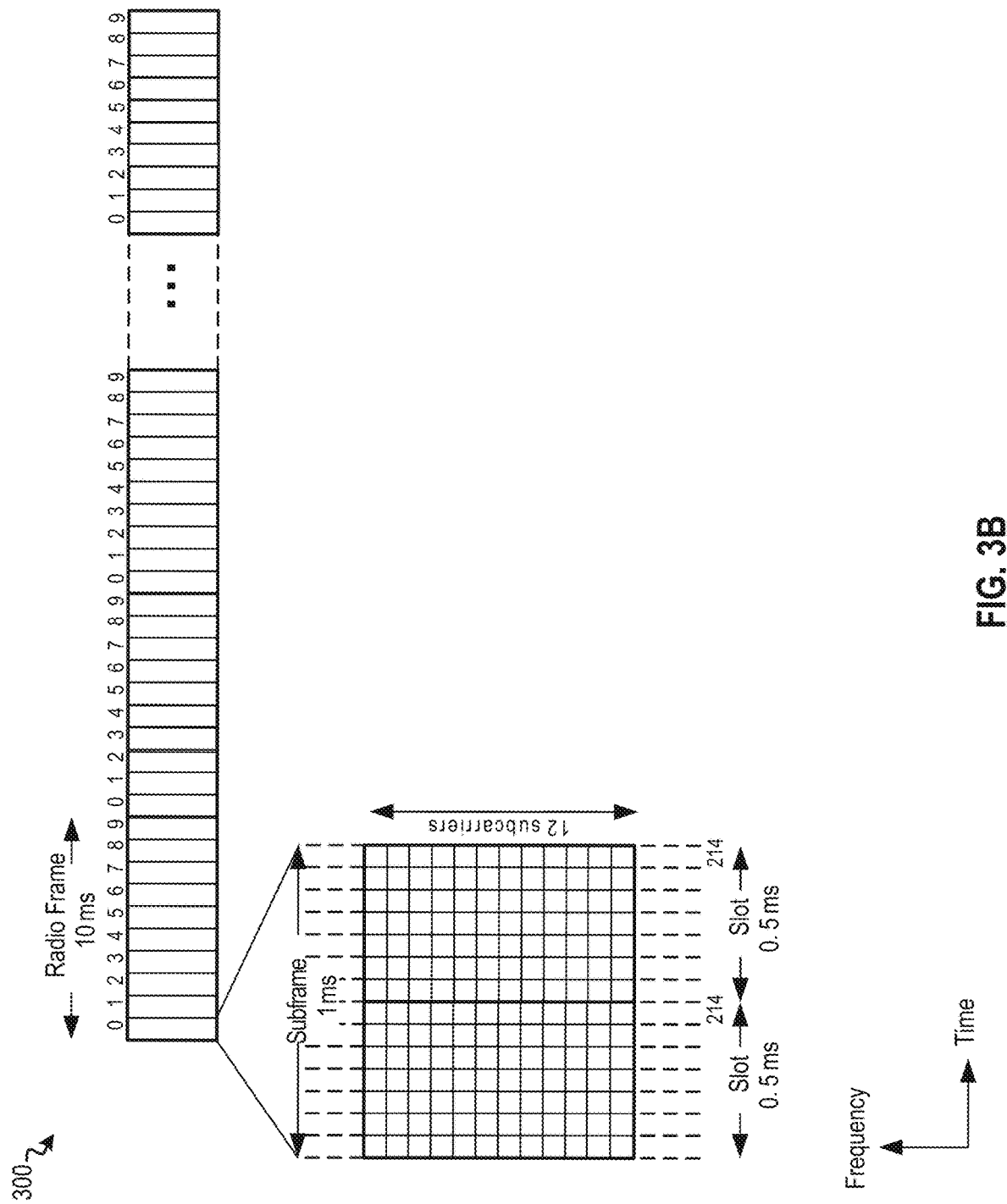

In the wireless communication network shown in FIG. 1 and FIG. 2, a base station can transmit a set of radio signals across a range of time intervals to form a radio frame, which comprises multiple subframes, and each subframe can include multiple transmission time slots. FIG. 3A and FIG. 3B illustrate an exemplary frame structure 300 for FDD in, for example, an LTE network, a 5G network, etc. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, with each symbol period defining the duration of a symbol. The symbols can be used to represent the information to be transmitted. The 2L symbol periods in each subframe may be assigned indices of 0 through 2L−1.

Figure 3C:
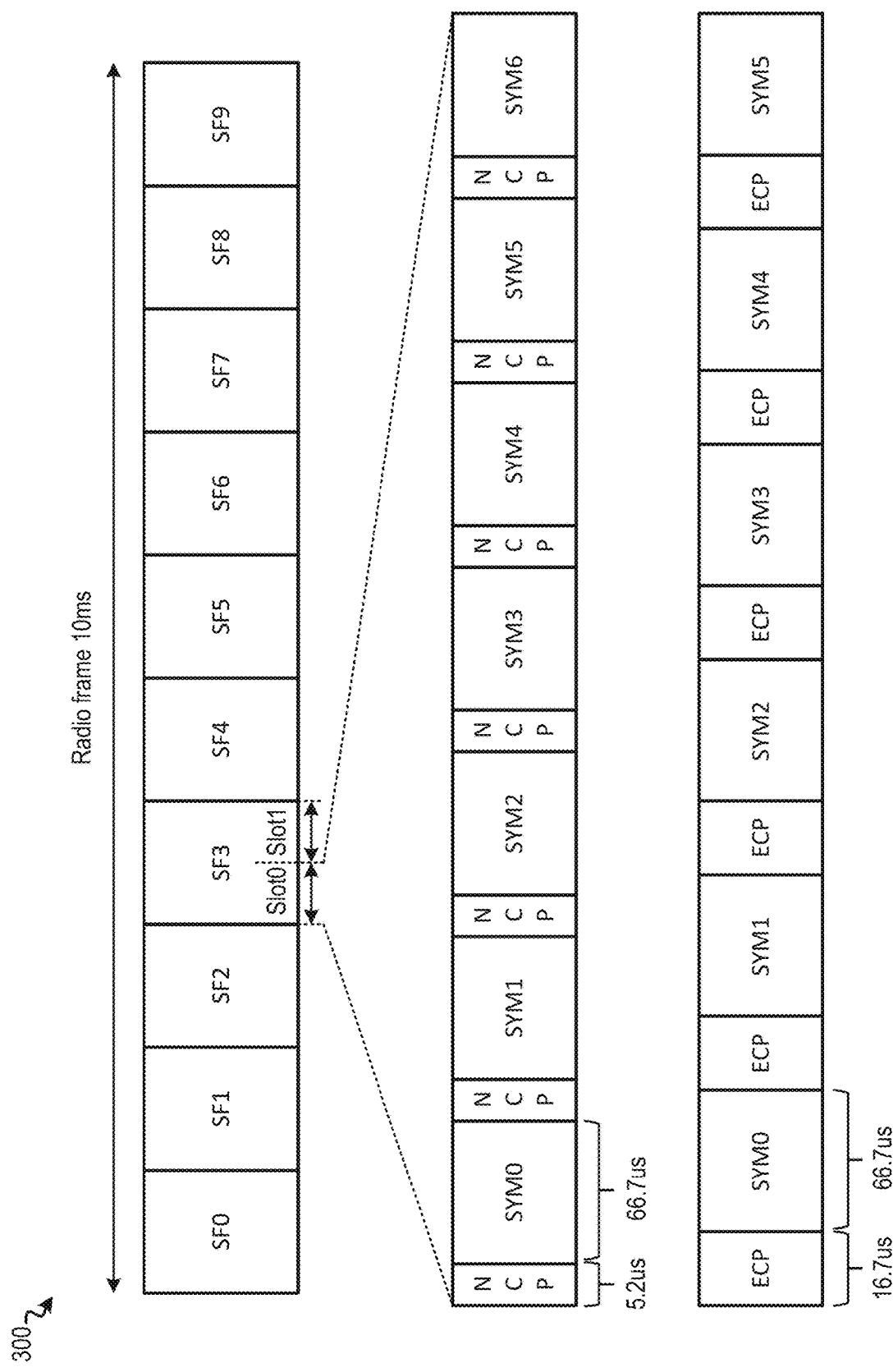

The duration of a symbol can be based on a cyclic prefix arrangement, in which part of the symbol is duplicated and inserted at the front of the symbol to mitigate the effect of inter symbol interference (ISI) due to the multipath effect. FIG. 3C illustrates examples of cyclic prefix arrangements in a slot of a subframe. As shown in FIG. 3C, each symbol can have a duration of 66.7 microseconds (us). In a case of normal cyclic prefix, a prefix having a duration of 5.2 us is added in front of each symbol, whereas in a case of extended cyclic prefix, a prefix having a duration of 16.7 us is added in front of each symbol. In both cases, the prefix is generated by replicating part of the succeeding symbol. The normal cyclic prefix is used in urban cells and high data rate applications, while the extended cyclic prefix is used in cases where the signal has to travel over a long distance, such as in a MBSFN where multiple base stations broadcast signals that cover a MBSFN area spanning multiple cells.

The cyclic prefix changes the symbol duration and determines the number of symbols in a transmission time slot. For example, as shown in FIG. 3C, in a case where the symbols include normal cyclic prefixes, there can be seven symbol periods (for symbols SYM0-SYM6) in a transmission slot. Moreover, in a case where the symbol include extended cyclic prefixes there can be six symbol periods (for symbols SYM0-SYM5). Symbols having different cyclic prefixes require different digital signal processing configurations to recover the symbols from the radio signals. For example, based on whether the received symbols have NCP or ECP, the digital signal processor may skip a different number of samples of radio signals received within a symbol period, which correspond to the cyclic prefix, and then process the rest of the samples received within the symbol period to recover the symbol. Referring to FIG. 3C, for a given sampling rate, a symbol may be represented by 2048 samples of radio signals. A normal cyclic prefix may be represented by 160 samples in the first symbol period and represented by 144 samples in other symbol periods, whereas an extended cyclic prefix may be represented by 512 samples. Therefore, in a case where the received symbols include normal cyclic prefixes, the digital signal processor can skip the first 160 samples of radio signals received in each symbol period, whereas in a case where the received symbols include extended cyclic prefixes, the digital signal processor can skip the first 512 samples of radio signals received in each symbol period to remove the cyclic prefix in time domain, and then perform processing on the remaining 2048 samples in the symbol period. The processing may include Fast Fourier Transform operation, descrambling operation, rotation, DC compensation, followed by an inverse Fast Fourier Transform operation.

Moreover, each slot may also be associated with a number of sub-carriers. The slots (associated with particular subframes and frames), and the subcarriers associated with the slots, can form the basis of a resource block (RB). The resource blocks can be allocated to multiple UEs, an allocation which in turn determines when the UEs transmit and receive information. For example, each UE can be allocated a set of resource blocks in the uplink and downlink radio frames for performing data communication. Based on the set of allocated resource blocks, the UE can transmit data at certain slots (within a certain subframe and frame), and using the sub-carriers associated with those slots to transmit the symbols. To avoid interference and corruption, different UEs are allocated different resource blocks, and different sets of sub-carriers are used for uplink transmission. For example, when two UEs transmit a slot of a radio frame simultaneously, one slot transmitted by one UE will be associated with a different set of sub-carriers from the other slot transmitted by the other UE. Accordingly, the UEs can be scheduled to transmit information using different sets of sub-carriers at different time-intervals. Likewise, based on the allocated resource blocks information, a UE can also selectively process certain slots of radio frames received from the downlink transmission from the base station, with those slots carrying information targeted at that UE.

As shown in FIG. 3A, on the downlink in LTE, a cell may transmit a Physical Control Format Indicator Channel (PCFICH), a Physical HARQ Indicator Channel (PHICH), and a Physical Downlink Control Channel (PDCCH) in a control region of a subframe. The PCFICH may convey the size of the control region. The PHICH may carry acknowledgement (ACK) and negative acknowledgement (NACK) feedback for data transmission sent on the uplink with HARQ. The PDCCH may carry downlink grants, uplink grants, scheduling information, and/or other control information. The cell may also transmit a Physical Downlink Shared Channel (PDSCH) in a data region of a subframe (not shown in FIG. 2A). The PDSCH may carry data for UEs scheduled for data transmission on the downlink.

As shown in FIG. 3A, on the downlink in LTE, a cell may transmit a Physical Control Format Indicator Channel (PCFICH), a Physical HARQ Indicator Channel (PHICH), and a Physical Downlink Control Channel (PDCCH) in a control region of a subframe. The PCFICH may convey the size of the control region. The PHICH may carry acknowledgement (ACK) and negative acknowledgement (NACK) feedback for data transmission sent on the uplink with HARQ. The PDCCH may carry downlink grants, uplink grants, and/or other control information. The cell may also transmit a Physical Downlink Shared Channel (PDSCH) in a data region of a subframe. The PDSCH may carry data for UEs scheduled for data transmission on the downlink.

The cell may also transmit a primary synchronization signal (PSS) and a secondary synchronization signal (SSS) on the downlink at a center frequency of, e.g., 1.08 MHz of the system bandwidth. For FDD, the PSS and SSS may be transmitted in symbol periods 6 and 5, respectively, in subframes 0 and 5 of each radio frame with the normal cyclic prefix, as shown in FIG. 3A. While not shown in the figure, subframe 5 may also contain other information, such as System Information Block (SIB), which may include radio resource configuration information, common and shared configuration, timers, etc. For example, the SIB block may include MBSFN configuration information, as to be discussed below.

In addition, the base station may also transmit a reference signal in certain symbol periods of each subframe. A reference signal is a signal that is known a priori by a transmitter and a receiver and may also be referred to as a pilot. A UE can perform various signal measurements, such as Received Signal Strength Indication (RSSI), Round Trip signal propagation Time (RTT), Reference Signal Time Difference (RSTD), Reference Signal Received Power (RSRP) and/or Reference Signal Received Quality (RSRQ) on the received reference signals.

Figure 3D:
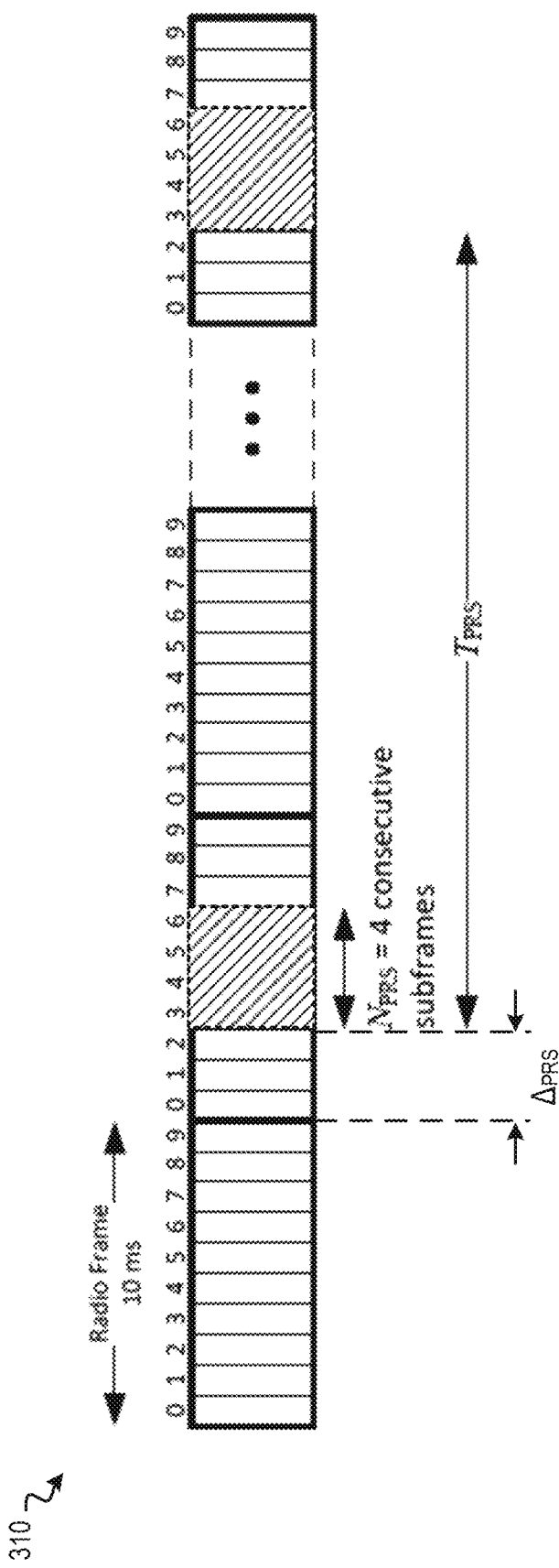

One example reference signal is a positioning reference signal (PRS), which can be used by UE to measure the RSTD to support UE-assisted position method. FIG. 3D illustrates an example radio frame structure 310 of transmission of PRS signals. PRS signals are transmitted in pre-defined positioning subframes grouped by consecutive subframes $N_{PRS}$. Depending on whether the PRS symbols include extended cyclic prefix (ECP) or normal cyclic prefix (NCP), there can be 12 PRS symbols or 14 PRS symbols in a subframe. Each group of positioning subframes can be termed as "positioning occasions" and can occur periodically with a predetermined periodicity $T_{PRS}$. The period $T_{PRS}$ can be, for example, 160, 320, 640, or 1280 subframes, etc. The number of consecutive subframes $N_{PRS}$ can be 1, 2, 4, or 6 subframes. The scheduling of transmission of PRS signals can be configured based on a cell-specific subframe offset $\Delta_{PRS}$, which may define the starting subframe of PRS transmission, relative to a system frame number (SFN). SFN can be a timestamp provided by a location server, such as LMF 220, as part of assistance data. SFN can be associated with one or more serving cells of the UE, and can serve as a reference for defining the subframe position PRS signals. Based on subframe offset $\Delta_{PRS}$, period $T_{PRS}$, as well as consecutive subframes $N_{PRS}$, the transmission timing of the PRS symbols can be predetermined.

To perform location estimation, UE 105 can measure Reference Signal Time Difference (RSTD) based on the PRS. The RSTD can be measured based on a signal (e.g., a PRS) received from a reference cell and a corresponding signal received from a neighboring cell. To measure the RSTD between, for example, a reference cell and a neighboring cell, UE 105 can determine the time when the UE receives the start of one PRS subframe from a reference cell, and the time when the UE receives the start of a corresponding PRS subframe from a neighboring cell, to determine the TOA difference. UE 105 can also measure the RSTD between a reference cell and a different neighboring cell, and then provide the RSTD results to the location server. The location server can then estimate the location of UE 105 based on the RSTD results and the known positions of the base stations of the reference cell and the neighboring cells.

Figure 3E:
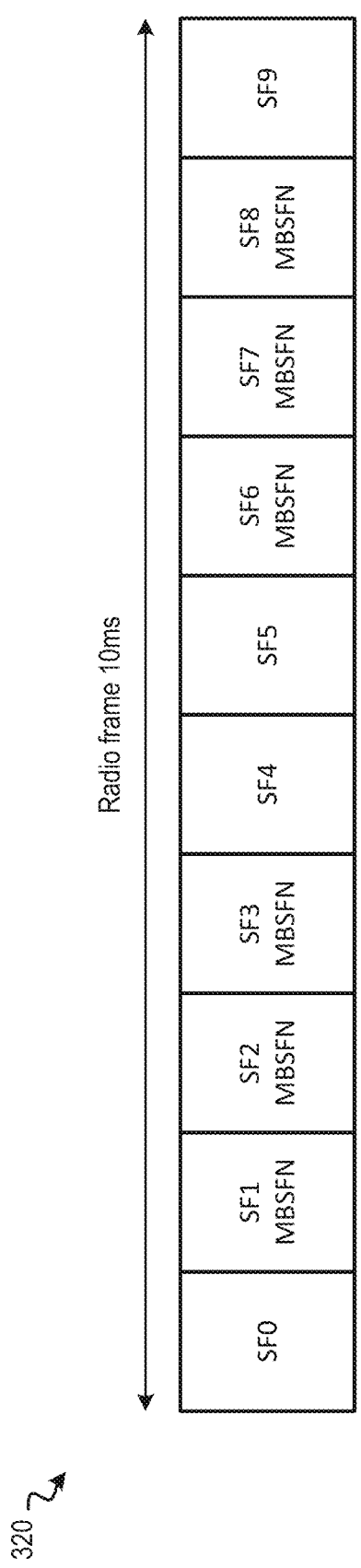

In addition to PRS signals, a base station can use the example radio frame structure 300 of FIG. 3A and FIG. 3B to transmit MBMS data. FIG. 3E illustrates an example radio frame structure 320 for transmitting MBMS data. As shown in FIG. 3E, in a radio frame structure 320, MBMS data can be transmitted in subframe number 1 (SF1), subframe number 2 (SF2), subframe number 3 (SF3), subframe number 6 (SF6), subframe number 7 (SF7) and subframe number 8 (SF8). The rest of subframes of the radio frame can be used to for other types of transmission, such as unicast transmission. The MBMS symbols typically include extended cyclic prefix (ECP), as the broadcasted signals need to travel over a relatively long distance to cover a MBSFN area covered by multiple cells.

Figure 4A:
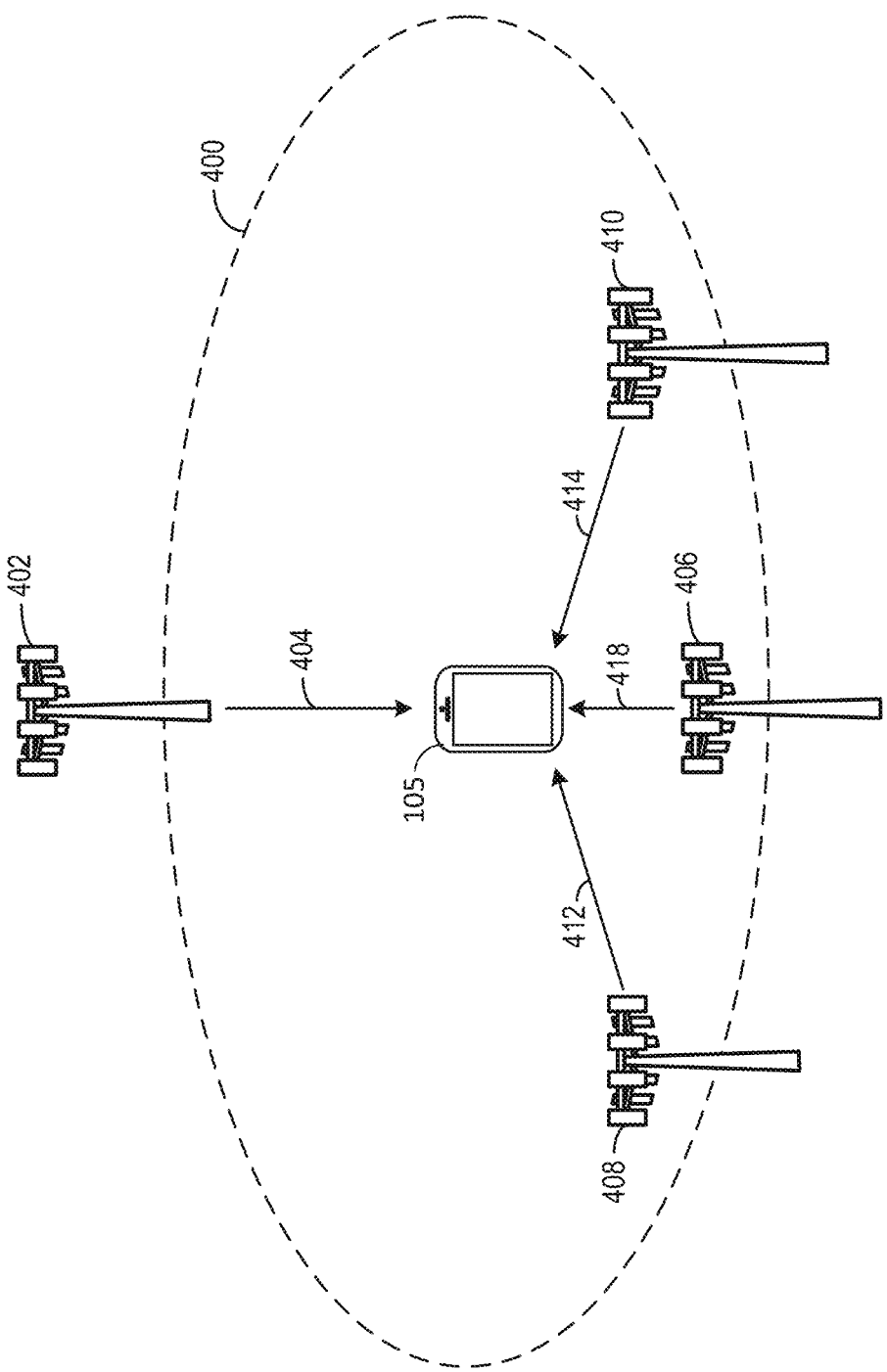
FIGS. 4A-4C illustrate example scenarios where base stations that belong to an MBSFN also transmit position reference signals (PRS) signals, according to examples of the present disclosure.

Base stations that belong to an MBSFN can also transmit PRS signals to support both a MBMS broadcast operation as well as a position determination operation at the UEs. For example, referring to FIG. 4A, UE 105 can be in a MBSFN area 400. Base station 402, which can belong to the MBSFN, can transmit a radio frame 404 including MBMS symbols in MBSFN subframes (e.g., SF1, SF2, SF3, SF6, SF7, and SF8 of FIG. 3E) to support a multicast broadcast operation. If selected by UE 105 to measure the PRS with the UE, base station 402 can also transmit, using radio frames 404, PRS symbols to support network based positioning of UE 105. In addition, there are other base stations, including base stations 406, 408, and 410, that do not belong to the MBSFN. Base stations 406, 408, and 410 may also transmit, respectively, radio frames 412, 414, and 418 including PRS symbols to UE 105, if they are selected to measure the PRS with the UE. UE can identify base stations 402, 406, 408, and 410 based on assistance data received from a location server (e.g., LMF 220), which lists the reference cell as well as candidate neighbor cells with which UE 105 can measure the PRS to obtain, for example, RSTD between the reference cell and the neighbor cells to support position determination of UE 105.

In certain scenarios, in a positioning occasion, base station 402 may transmit PRS symbols entirely in MBSFN subframes in radio frame 404, and the PRS symbols in a MBSFN subframe may include a mixture of symbols having NCP and symbols having ECP. On the other hand, cells that transmits PRS symbols with a mixture of MBSFN subframes and non-MBSFN subframes (e.g., base station 402), as well as a cell that do not transmit MBSFN subframes (e.g., base stations 406, 408, and 410), may transmit PRS symbols having only NCP, or PRS symbols having the same cyclic prefix as the subframe zero of a radio frame.

Figure 4B:
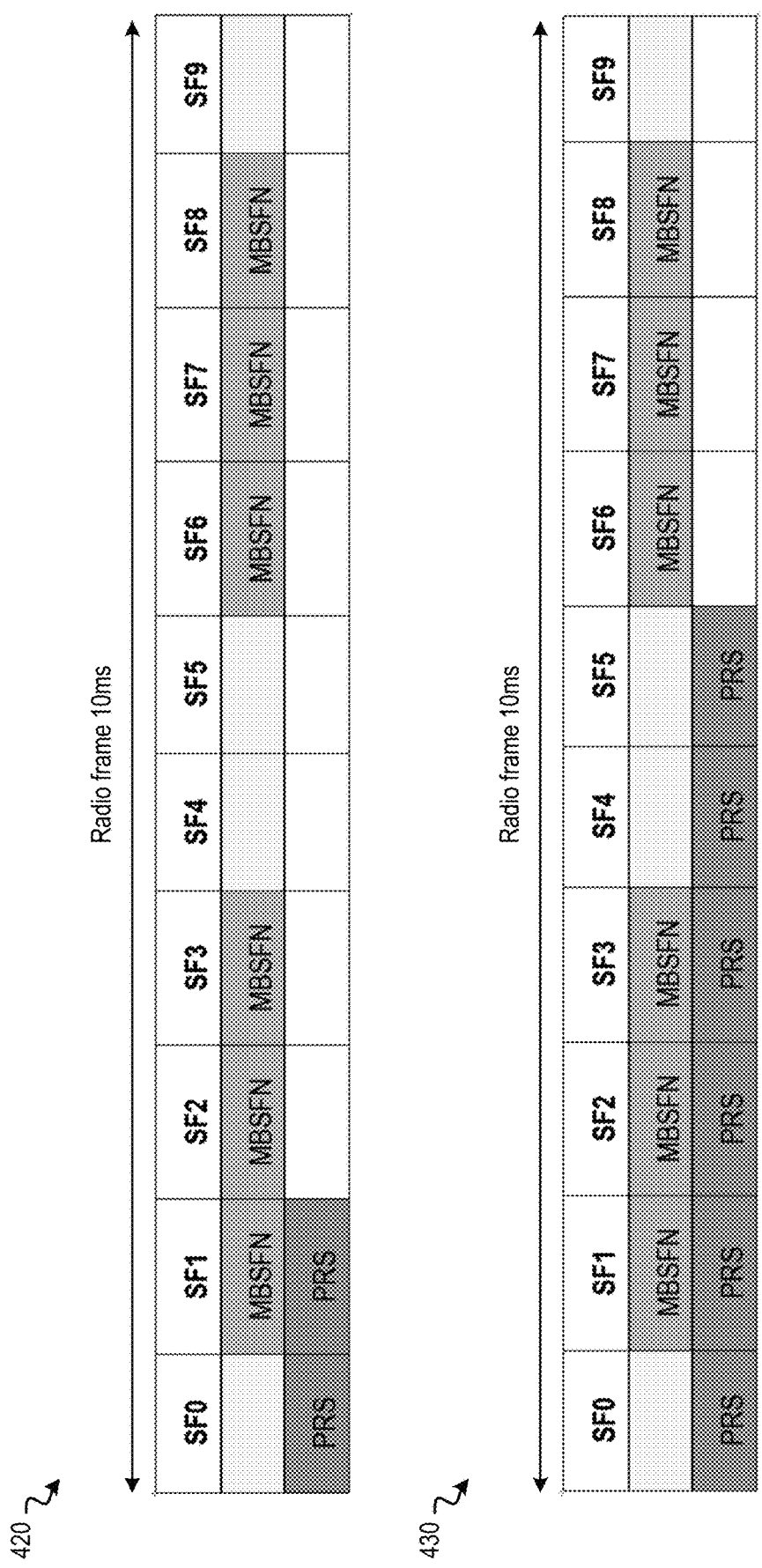
Figure 4C:
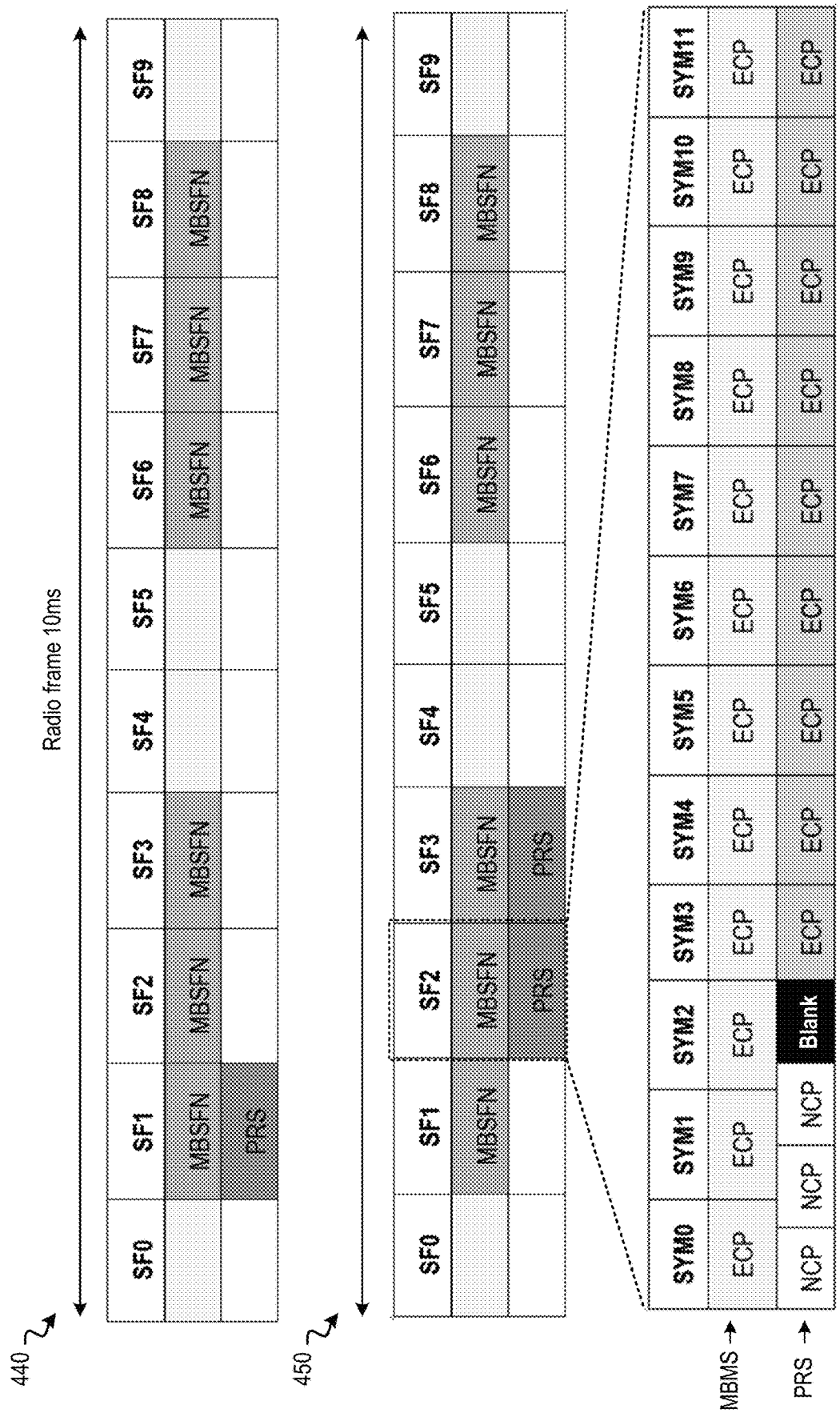

FIG. 4B and FIG. 4C illustrate examples of radio frames in a positioning occasion that carry both MBMS and PRS symbols. FIG. 4B illustrates example radio frame structures 420 and 430 in which non-MBSFN subframes are used to transmit PRS symbols. Radio frame structures 420 and 430 can be part of radio frame 404 transmitted by base station 402 in FIG. 4A. Radio frame structure 420 can correspond to a case where the bandwidth of PRS signal is 5 MHz, the number $N_{PRS}$ of consecutive positioning subframes is two, and subframe offset $\Delta_{PRS}$ is zero, such that the subframe zero (SF0) of the radio frame carries PRS symbol, and there are two subframes that carry PRS symbols (SF0 and SF1). Radio frame structure 430 can correspond to a case where the bandwidth of PRS signal is 3 MHz, the number $N_{PRS}$ of consecutive positioning subframes is six, and subframe offset $\Delta_{PRS}$ is zero, such that the subframes zero to five (SF0-SF5) of the radio frame carries PRS symbols. In both radio frame structures 420 and 430, PRS symbols are carried in non-MBSFN subframes (e.g., subframe zero in radio frame structure 420, subframe zero and subframes four and five in radio frame structure 430) and in MBSFN subframes (subframe one in radio frame structure 420, subframes one to three in radio frame structure 430). Both radio frame structures 420 and 430 can be regarded as having partial overlap between PRS subframes and MBSFN subframes.

According to 3GPP LTE specification 36.211 section 6.10.4, if both non-MBSFN and MBSFN subframes are configured as positioning subframes within a cell, the PRS symbols in a MBSFN subframe shall use the same cyclic prefix as used for subframe zero. In the example radio frame structures 420 and 430, if the PRS symbols in subframe zero have normal cyclic prefix (NCP), each PRS symbol in the rest of the subframes (e.g., subframe zero in radio frame 420, subframe zero to subframe five in radio frame 430) will also have NCP. On the other hand, if the PRS symbols in subframe zero have extended cyclic prefix (ECP), each PRS symbol in the rest of the subframes (e.g., subframe one in radio frame 420, subframes one to five in radio frame 430) will also have ECP.

From assistance data from a location server (e.g., LMF 220), a UE can obtain the cyclic prefix length information of the PRS symbols transmitted by a particular base station, and configure its symbol recovery operations based on whether the PRS symbols have ECP or NCP to recover the PRS symbols from the radio subframes in a positioning occasion. As the PRS symbols in radio frames 420 and 430 have the same CP length (ECP or NCP) in a positioning occasion, the UE can recover all the PRS symbols sent by base station 402 using a single CP configuration for its symbol recovery operation.

FIG. 4C illustrates example radio frame structures 440 and 450 in which non-MBSFN subframes are used to transmit PRS symbols. Radio frame structures 440 and 450 can be part of radio frame 404 transmitted by base station 402 in FIG. 4A. Radio frame structure 440 can correspond to a case where the bandwidth of PRS signal is 20 MHz, the number $N_{PRS}$ of consecutive positioning subframes is one, and subframe offset $\Delta_{PRS}$ is one, such that that the PRS symbols are carried in subframe one (SF1). In radio frame structure 440, as subframe one is a MBSFN subframe and PRS symbols are carried in only subframe one, all the PRS symbols in one positioning occasion are carried by a MBSFN subframe. In addition, radio frame structure 450 can correspond to a case where the bandwidth of PRS signal is 5 MHz, the number $N_{PRS}$ of consecutive positioning subframes is two, and subframe offset $\Delta_{PRS}$ is two, such that PRS symbols are carried in subframe two and subframe three (SF2 and SF3). In radio frame structure 450, as subframe two and subframe three are MBSFN subframes, and PRS symbols carried in only subframes two and subframes three, all the PRS symbols in one positioning occasion are carried by MBSFN subframes. Both radio frame structures 440 and 450 can be regarded as having complete overlap between PRS subframes and MBSFN subframes.

In the example radio frame structures 440 and 450, the PRS symbols in a subframe may include a mixture of symbols having normal cyclic prefix (NCP) and symbols having extended cyclic prefix (ECP). Specifically, according to 3GPP LTE specification 36.211 section 6.10.4, if only MBSFN subframes are configured as positioning subframes within a cell, the PRS symbols in those MBSFN subframes shall use extended cyclic prefix length. In a case where a cell is configured to send PRS symbols having NCP, the cell may transmit the MBMS symbols having ECP within the twelve symbol periods (SYM0-SYM11) in a MBSFN subframe, but for the PRS symbols, within the first three symbol periods (SYM0-SYM2) the cell may transmit the first three symbols having NCP, followed by a blanking period, and then followed by PRS symbols having ECP for the rest of symbol periods (SYM3-SYM11).

Referring back to FIG. 4A, with current technologies, UE 105 will always measure the PRS with base station 402, which transmits radio frame 404 including both PRS and MBMS symbols. There can be various issues with such arrangements. First, UE 105 may be able to only measure the PRS with base station 402 but not with other base stations in FIG. 4A. Specifically, base station 402 may use a mixture of MBSFN subframes and non-MBSFN subframes to transmit PRS symbols in a positioning occasion, as shown in the examples of FIG. 4B, and the PRS symbols sent by base station 402 have a different CP length from those sent by base stations 406, 408, and 410. For example, the PRS symbols sent by base station 402 may have ECP, while the PRS symbols sent by base stations 406, 408, and 410 may have NCP. UE 105 may adopt the signal processing configurations for symbols having ECP to recover the PRS symbols, in which UE 105 skips a predetermined number of samples of radio signals corresponding to an ECP (e.g., 512 samples) and then process the remaining samples of radio signals (e.g., 2048 samples) in a symbol period to recover the symbol. But since UE 105 cannot switch configurations within a positioning occasion, within that positioning occasion UE 105 can only fully recover PRS symbols having ECP from base station 402. If UE 105 uses an ECP configuration to process PRS symbols having NCP, UE 105 will skip a wrong number of samples for the NCP (e.g., skip 512 samples for ECP, when in fact the NCP has only 160 samples) for each symbol period, and may be unable to recover the PRS symbols from base stations 406, 408, and 410. As a result, UE 105 may be unable to measure the PRS with 406, 408, and 410, which can prevent the UE from further refining the position determination and degrade the accuracy of the position determination operation by UE 105.

In addition, base station 402 may also transmit the PRS symbols using only the MBSFN subframes in a positioning occasion, as shown in the examples of FIG. 4C, and UE 105 may be unable to recover all the PRS symbols sent by base station 402 even if it adopts the ECP configuration. Specifically, in a case where PRS symbols are sent in each symbol period, the first three PRS symbols have NCP, followed by the blanking period, and then followed by PRS symbols having ECP, as shown in FIG. 4C. With a signal processing configurations for symbols having ECP, UE 105 may be unable to recover the first three PRS symbols as they have NCP. Since not all the PRS symbols are recovered, inaccurate position determination may result, while UE 105 cannot refine the position determination operation based on PRS measurements with base stations 406, 408, and 410 as explained above.

FIG. 5 illustrates an example operation 500 of position determination at UE 105 that can address some of the issues above. Specifically, based on information about the MBSFN subframes and PRS subframes transmitted by a set of candidate cells with which UE 105 can measure the PRS, UE 105 can classify the candidate cells into two cell groups 502 and 504. The classification can be based on whether a cell transmits PRS symbols in MBSFN subframes in a positioning occasion, and based on the CP length (ECP or NCP) of the PRS symbols being transmitted by the cell. In one example, cells group 502 may include cells that transmit PRS symbols only in MBSFN subframes, and the PRS symbols may include ECP, or a mixture of ECP and NCP. Cell group 504 may include cells that transmit PRS symbols in NCP, including cells that belong to the MBSFN but transmits PRS symbols in a mixture of MBSFN subframes and non-MBSFN subframe (e.g., subframe zero) in a positioning occasion, as well as cells that do not belong to the MBSFN and hence transmit PRS symbols in non-MBSFN subframe in the positioning occasion.

UE 105 can then select, based on one or more predetermined criteria, one of the cell group 502 or cell group 504 to measure the PRS. As to be described below, the selection criteria may include, for example, an overall performance metric for each cell group, whether PRS measurement is performed with a particular cell group in a prior positioning occasion, etc. UE 105 can then measure the PRS with the selected cell group to obtain measurement results, and determine a position of the UE based on results of the PRS measurements. For example, in FIG. 5, UE 105 can select cell group 504 and adopts a NCP configuration for its digital signal processor to recover PRS symbols having NCP from PRS signals received from each base station of cell group 504 in a positioning occasion. UE 105 can then measure the time of arrivals (TOAs) of the recovered PRS signals, determine RSTDs based on the TOAs for that positioning occasion, and determine a position of UE 105 based on the RSTDs and known positions of the base stations of cell group 504. On the other hand, in that positioning occasion UE 105 do not measure the PRS with cell group 502.

In some examples, UE 105 may measure the PRS with both cell groups but using the CP configuration for the selected cell. The position determination is based on a weighted combination of the PRS measurement results from the selected cell group and the non-selected cell group, with the PRS measurement results from the selected cell group assigned a larger weight than the non-selected cell group. In the example of FIG. 5, UE 105 may use NCP configuration to recover PRS symbols from both cell groups 502 and 504 in the same positioning occasion, measure TOAs of the recovered PRS signals, determine RSTDs based on the TOAs, and generate a location estimate based on the RSTD and the known position of the base stations of each cell group. UE 105 can assign a weight to each position estimate, with a larger weight assigned to location estimates from PRS measurements with selected cell group (e.g., cell group 504) and a smaller weight assigned to position estimates from PRS measurements with non-selected cell group (e.g., cell group 502). The smaller weight can be assigned due to, for example, using NCP configuration to recover PRS symbols having ECP, which is likely lead to errors in the symbol recovery as well as errors in the PRS measurement, but the PRS measurement can still be used to refine or check against the PRS measurements from the selected cell group. The UE can then determine its position based on a weighted average of the position estimates.

The UE can obtain the MBSFN subframe and PRS subframe information, as well as the CP length of the PRS symbols, from various sources, such as System Information Block (SIB) messages, assistance data, etc. FIG. 6A and FIG. 6B illustrate examples of SIB messages which can be sent by a base station to a UE after the UE selects a cell. FIG. 6A illustrates an example of System Information Block Type 2 (SIB 2) message, which can include radio source configuration used by the UE to receive downlink data. As shown in FIG. 6A, SIB 2 message can include a mbsfn-SubframeConfigList information element 602 which defines the subframes from a base station/cell that are reserved for MBSFN in downlink. In addition, FIG. 6B illustrates an example of System Information Block Type 13 (SIB 13) message which can be transmitted by a base station to provide information for acquiring MBMS control information associated with one or more MBSFN areas. The sf-AllocInfo information element 604 can define the subframes of the radio that may carry the control information. From SIB 2 and SIB 13 messages, a UE can determine the subframe numbers of the MBSFN subframes that carry MBMS symbols and control information for the MBSFN. In some examples, assistance data from a location server (e.g., LMF 220) can also provide the subframe numbers of the MBSFN subframe.

In addition, the UE can obtain PRS subframe information of a cell from assistance data transmitted by the location server. FIG. 6C, FIG. 6D, and FIG. 6E illustrate examples of assistance data 610 to support an OTDOA operation. As shown in FIG. 6C, assistance data 610 can include a reference cell information element 612 for a reference cell that can provides a TOA reference to measure a RSTD, as well as a neighbor cells information element 614 for a set of neighbor cells that can provide TOA measurements. The TOA measurements can be compared with the TOA reference from the reference cell to determine RSTDs. The set of neighbor cells is listed in NeighborCellInfoList information element 615 of FIG. 6E.

FIG. 6D and FIG. 6E illustrate example components of reference cell information element 612 and neighbor cells information element 614, both of which include a cplength information element 616 and a prsInfo information element 618. The cplength information element 616 can define a length of CP of the PRS symbols transmitted by the reference/neighbor cell, which can be either ECP or NCP. The prsInfo information element 618 can include a prs-ConfigurationIndex element 620 and a numDL-Frames element 622. The prs-ConfigurationIndex element 620 can define subframe offset $\Delta_{PRS}$ which can indicate the starting subframe of PRS transmission by the reference/neighbor cell. Moreover, the numDL-Frames element 618 can define the number of consecutive subframes ($N_{PRS}$) of PRS transmission. Based on subframe offset $\Delta_{PRS}$ and $N_{PRS}$, UE 105 can determine the subframe numbers of the PRS subframes that carry PRS symbols.

By identifying the cells that transmit the SIB 3 and SIB 13 messages, as well as the neighbor cells listed in NeighborCellInfoList information element 615 of assistance data, UE 105 can identify a set of candidate cells, in addition to the reference cell, with which UE 105 can measure the PRS. Some of the candidate cells may belong to a MBSFN and transmit both PRS and MBMS symbols, while some of the candidate cells may transmit PRS but not MBMS symbols. UE 105 can also identify the PRS subframe numbers and MBSFN subframe numbers for the candidate cells based on SIB 3 and SIB 13 messages as well as prsInfo information element 618, and the CP length of the PRS symbols transmitted by the candidate cells.

FIG. 6F illustrates a data structure 630 that store a mapping between candidate cells (cells A, B, C, and D), their PRS subframe numbers, MBSFN subframe numbers, and CP length. Based on these information and predetermined classification criteria, cells A, B, and C are classified into cell group 504 of FIG. 5, whereas cell D is classified into cell group 502 of FIG. 5. In FIG. 6F, cell group 502 may include cell D which transmits PRS symbols only in MBSFN subframes (subframe one) with ECP, while cell group 504 include cells A and C which belong to the MBSFN but transmits PRS symbols in a mixture of MBSFN subframes and non-MBSFN subframe in a positioning occasion, as well as cell B which does not belong to the MBSFN, and cells A, B, and C transmit PRS symbols having NCP.

The UE can then select a candidate cell group, out of cell groups 502 or 504, to measure the PRS in a positioning occasion based on one or more predetermined criteria. In one example, the UE may determine one or more performance metrics of PRS measurements for cell groups 502 and 504, and can select the group that provides the better performance metric.

Figure 7A:
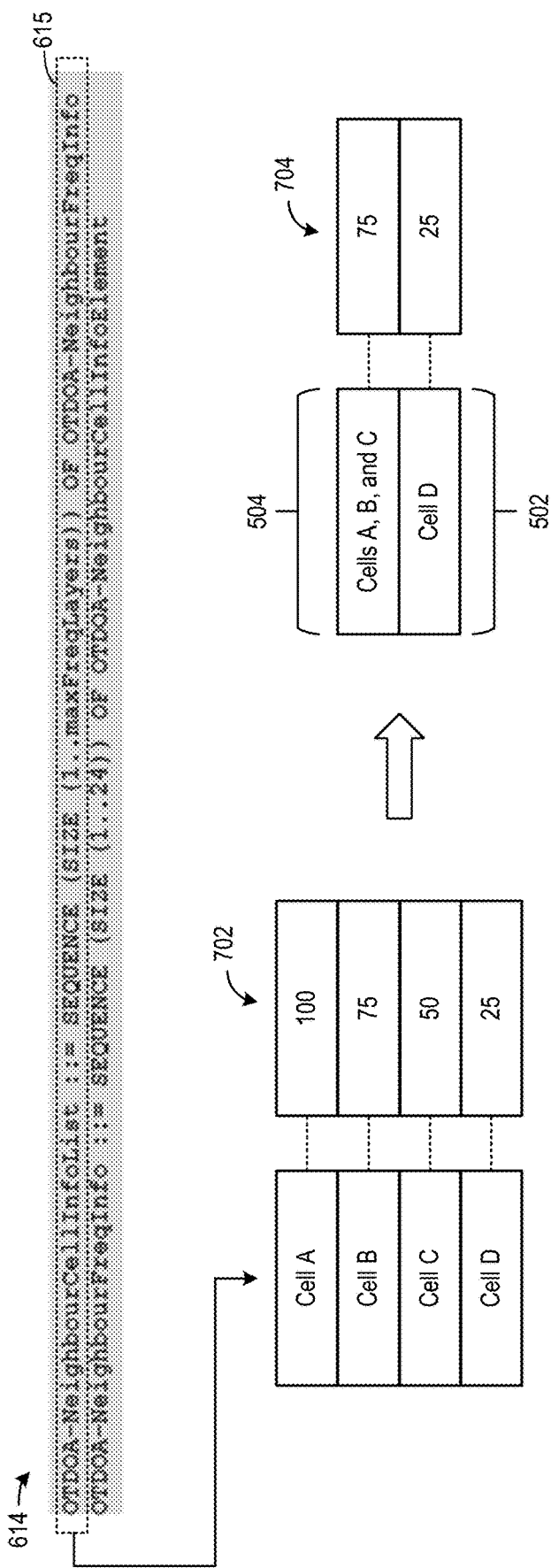
Figure 7B:
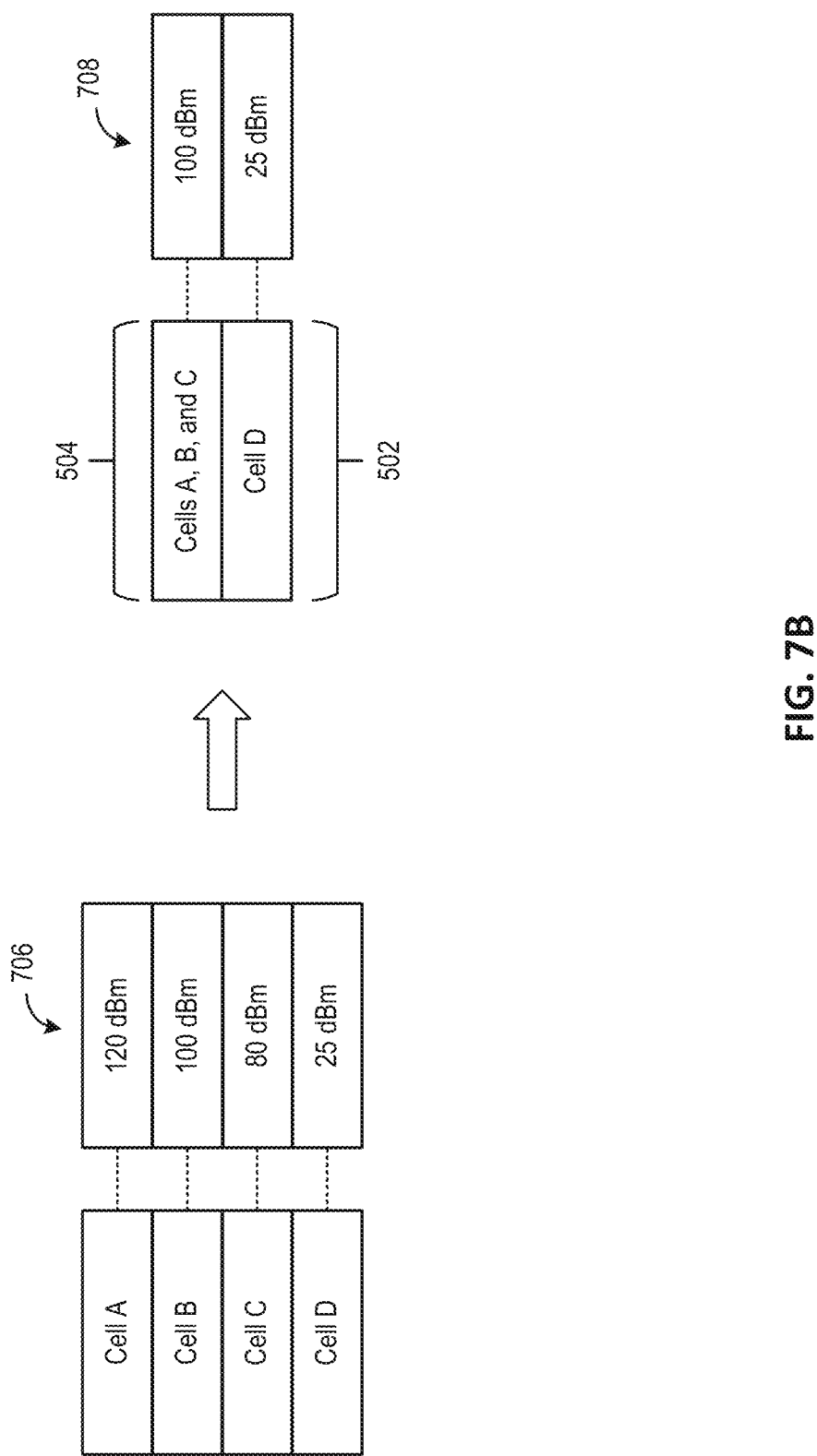

FIG. 7A and FIG. 7B illustrate examples of performance metrics. FIG. 7A illustrate an example performance metric based on the predicted reliability of PRS measurements with the candidate cells. As shown in FIG. 7A, NeighborCellInfoList information element 615 can include a list of neighboring cells including cells A, B, C, and D. The neighboring cells can be listed and sorted in a decreasing order of priority for PRS measurements. A neighboring cell listed as a higher priority cell (based on the order of the cells in the list) may reflect that PRS measurement with that cell is predicted to be more reliable, hence there is a higher priority to measure the PRS with that cell, compared with a neighboring cell listed as a lower priority cell. In the example of FIG. 7A, cell A can have the highest priority, followed by cell B and cell C, and cell D can have the lowest priority.

The UE can then determine an overall priority of the cells for each candidate cell group. In one example, as shown in FIG. 7A, UE can assign a priority score 702 that reflects the priority of the cell in NeighborCellInfoList information element 615, with a higher priority score assigned to a cell with a higher priority, and vice versa. UE 105 can then compute an overall priority score 704 of the cells for each of cell groups 502 and 504, can select the cell group having a higher overall priority score to measure the PRS. In the example of FIG. 7A, UE 105 can compute the overall priority score based on averaging the priority scores of the cells A, B, and C in cell group 504, while the average priority score in cell group 504 is the priority score of the standalone cell D in cell group 502. Based on the average priority score of cell group 504 being higher than that of cell group 502, UE 105 can select cell group 504 to measure the PRS.

FIG. 7B illustrates another example performance metric which can be based on a quality of signal received from the cells. Specifically, the UE can measure a signal quality of the PRS. The signal quality can be measured based on, for example, received signal strength indicator (RSSI), reference signal receive power (RSRP), etc., with the cells prior to a positioning occasion. RSSI measures the average total received power observed in reference symbols. RSRP is a type of RSSI measurement. RSRP can measure a linear average over the power contribution of the resource elements (REs) that carry cell-specific reference signals, such as R0 and R1. RSRP measurement is normally expressed in dBm and can be indicate the strength of signal received from a particular cell. A higher RSRP for a cell can indicate a higher quality of received signal from that cell compared with a cell with a lower RSRP. As shown in FIG. 7B, UE 105 can perform an RSRP measurement for each of cells A, B, C, and D and obtain RSRP measurement results 706 for each cell.

The UE can then determine an overall signal quality 708 of the cells for each of cell group, and then select the cell group having a higher overall signal quality to measure the PRS. In the example of FIG. 7B, UE 105 can compute the overall signal quality based on averaging the RSRP measurement results of the cells A, B, and C in cell group 504, while the average RSRP measurement result in cell group 504 is the RSRP measurement result of the standalone cell D in cell group 502. Based on the overall signal quality of cell group 504 being higher than that of cell group 502, UE 105 can also select cell group 504 to measure the PRS.

In some examples, UE 105 can measure the signal quality of the PRS with a subset of the cells listed in the assistance data, including intra-frequency cells. UE 105 can update the candidate cell groups to include only intra-frequency cells, and select the cell group based on signal quality results with the intra-frequency cells.

In some examples, UE 105 can also perform the selection of the candidate cell group (e.g., between cell groups 502 and 504) following a multi-stage approach. In a first stage, UE 105 can select between cell groups 502 and 504 based on the overall priority score of each group. The UE can then determine whether measuring the PRS with the selected group may lead to a less accurate position determination than with the non-selected group. The determination can be based on, for example, the selected group including far fewer cells than the non-selected group, and therefore providing fewer RSTD results to refine the location determination result. For example, referring back to the examples shown in FIG. 6F and FIG. 7A, if cell group 502 includes, in addition to cell D, a large number of other cells such that cell group 502 vastly outnumbers cell group 504, and the overall priority of cell group 504 is still higher than that of cell group 502, UE 105 may determine that selecting cell group 504 to measure the PRS may lead to a less accurate position determination than with the non-selected group.

Based on determining that selecting a cell group based on overall priority score may lead to a less accurate position determination than with the non-selected group, UE 105 can proceed to the second phase, in which UE 105 measure a signal quality of the PRS (based on, for example, RSSI, RSRP) with the cells in both groups, as described in FIG. 7B, and select the group which provides the higher overall signal quality. The group selected based on the higher overall signal quality may be the same or different from the group selected based on the higher overall priority, and the group selection based on overall signal quality can overrule the group selection based on overall priority.

In some examples, UE 105 may determine that the group selection at the end of the two-stage approach (based on overall priority, and then based on overall signal quality), does not identify a cell group that improves the location determination versus that other cell group. In such case, UE 105 may measure the PRS alternately between the cell groups 502 and 504 in each positioning occasion. For example, in a first positioning occasion, UE 105 may preform PRS measurements with cell group 502 to measure the RSTD, and use the RSTD results from cell group 502 to determine the position of UE 105. And then in a second positioning occasion, UE 105 may measure the PRS with cell group 504 to obtain RSTD results, and use the RSTD results from cell group 504 to refine the position determination of UE 105. In such a case, the selection of one cell group to measure the PRS in one positioning occasion will be based on that cell group not being selected in a prior positioning occasion.

As described above, in some examples UE 105 may measure the PRS with both cell groups but using the CP configuration for the selected cell in the same positioning occasion. In one example, UE 105 may use an NCP configuration to recover both symbols having NCP (from the selected cell) and symbols having ECP (from the non-selected cell). In another example, UE 105 may also use an ECP configuration to recover both symbols having ECP (from the selected cell) and symbols having NCP (from the non-selected cell). Such arrangements can expand the number of sources for measuring RSTD, and improve the accuracy of the position determination operation.

FIG. 7C illustrates an examples of symbols recovery arrangements 712 and 714 that can be used by UE 105. In symbol recovery arrangement 712, an NCP configuration is used to recover symbols having ECP, whereas in symbol recover arrangement 714, an ECP configuration is used to recover symbols having NCP. In symbol recovery arrangement 712, UE 105 can skip 160 samples of the NCP, perform processing on the next 2048 samples to recover a first symbol (SYM0), and then skip 144 samples of the NCP, followed by processing on the next 204 samples to recover a second symbol (SYM1). Applying an NCP configuration to recover symbols having ECP, there can be errors in the recovered symbols SYM0, SYM1, SYM2, etc., as the samples of each symbol do not align fully with the actual symbol being transmitted. For example, for SYM0, the samples designated as SYM0 (between samples 160 and 2208) do not overlap entirely with the actual SYM0 symbol having ECP (between samples 512 and 2560). But there are also symbols for which the samples align completely with the actual symbol and there can be no recovery error in those symbols. The following table shows the sample lost for some of the symbols in symbol recovery arrangement 712:

| Symbols | Samples loss |
|---|---|
| Symbols 5 and 11 | None |
| Symbols 4 and 10 | 368 |
| Symbol 7 | 736 |
| Symbol 8 | 1088 |

Table 1: symbol loss with using NCP configuration to recover ECP symbols

In symbol recovery arrangement 714, UE 105 can skip 512 samples of the NCP, perform IFFT on the next 2048 samples to recover a first symbol (SYM0), and then skip 144 samples of the NCP, followed by processing on the next 204 samples to recover a second symbol (SYM1). Applying an NCP configuration to recover symbols having ECP, there can be errors in the recovered symbols SYM0, SYM1, SYM2, etc., as the samples of each symbol do not align fully with the actual symbol being transmitted. For example, for SYM0, the samples designated as SYM0 (between samples 512 and 2560) do not overlap entirely with the actual SYM0 symbol having NCP (between samples 160 and 2208). But there are also symbols for which the samples align completely with the actual symbol and there can be no recovery error in those symbols. The following table shows the sample lost for some of the symbols:

| Symbols | Samples loss |
|---|---|
| Symbols 6 and 13 | None |
| Symbols 5 and 12 | 368 |
| Symbols 3 and 9 | 1104 |
| Symbol 7 | 736 |
| Symbol 8 | 1088 |

Table 2: symbol loss with using ECP configuration to recover NCP symbols

In some examples, UE 105 may select NCP configuration to recover both NCP symbols and ECP symbols due to, for example, the number of samples lost with such arrangements is less than a case where ECP configuration is used to recover NCP symbols, as shown in Tables 1 and 2. In addition, UE 105 may also determine the symbol recovery errors based on Tables 1 and 2 as well as the symbol periods in which the PRS symbols are transmitted, and assign a weight to cell based on the symbol recovery errors. For example, if the PRS symbols are transmitted only in the symbol periods corresponding to SYM5 and SYM11 in ECP (and recovered using NCP configuration) and SYM6 and SYM13 in NCP (and recovered using ECP configuration), UE 105 may determine that there is no symbol error and can still assign a large weight to the PRS measurement results from the non-selected cells.

With the disclosed techniques, a UE can select a candidate cell group to measure the PRS based on performance metrics (e.g., overall priority, overall signal quality), which can improve accuracies of the PRS measurements and the resulting position determination operation. Through the selection process the UE can also select a fewer number of cells which can offer more accurate PRS measurements, which can reduce the power consumption of the PRS measurements and position determination operations at the UE. All these can improve the performance of the UE.

Figure 8:
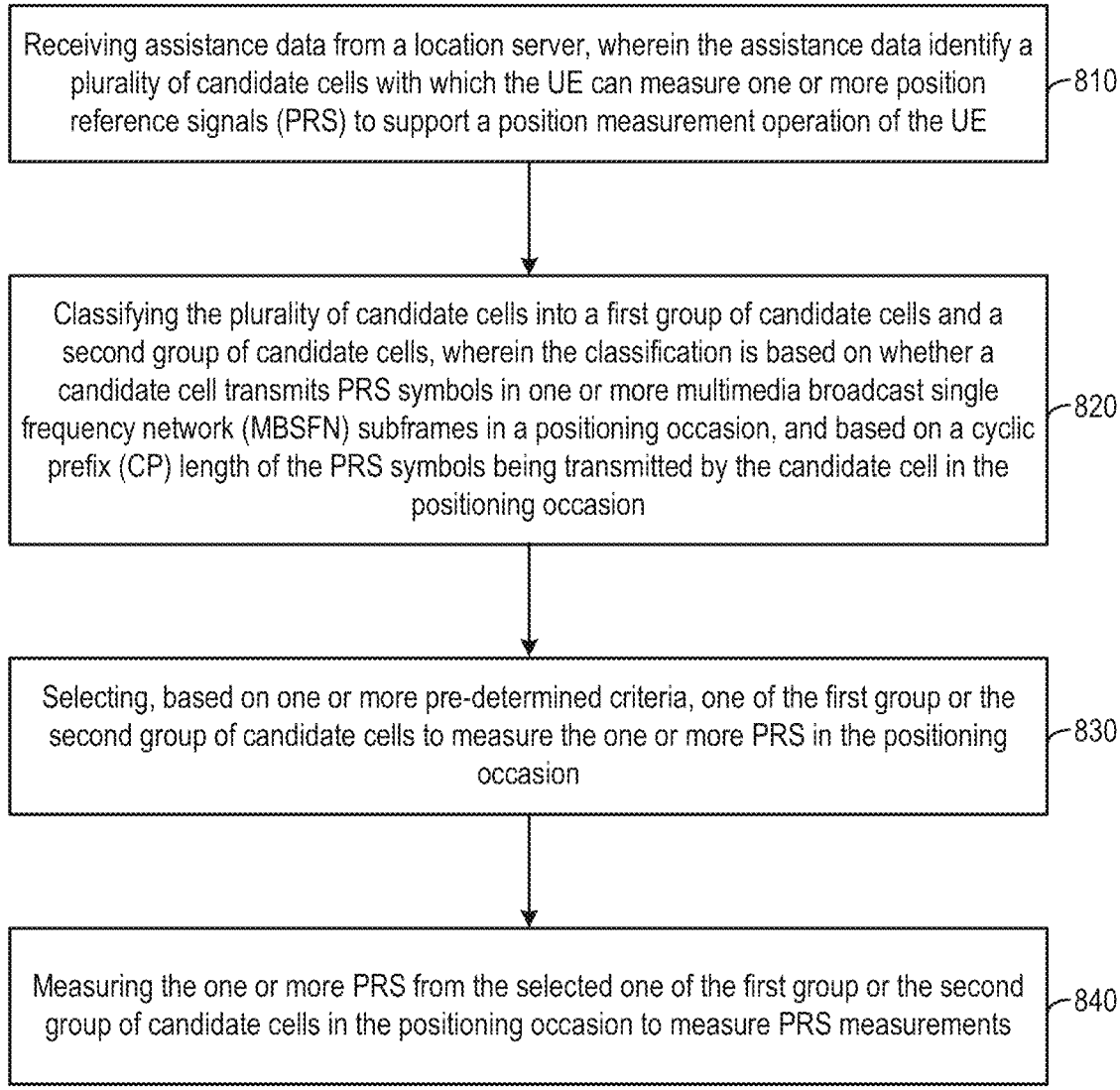
FIG. 8 is a flow diagram illustrating a method of determining a position of a UE, according to examples of the present disclosure.
Figure 9:
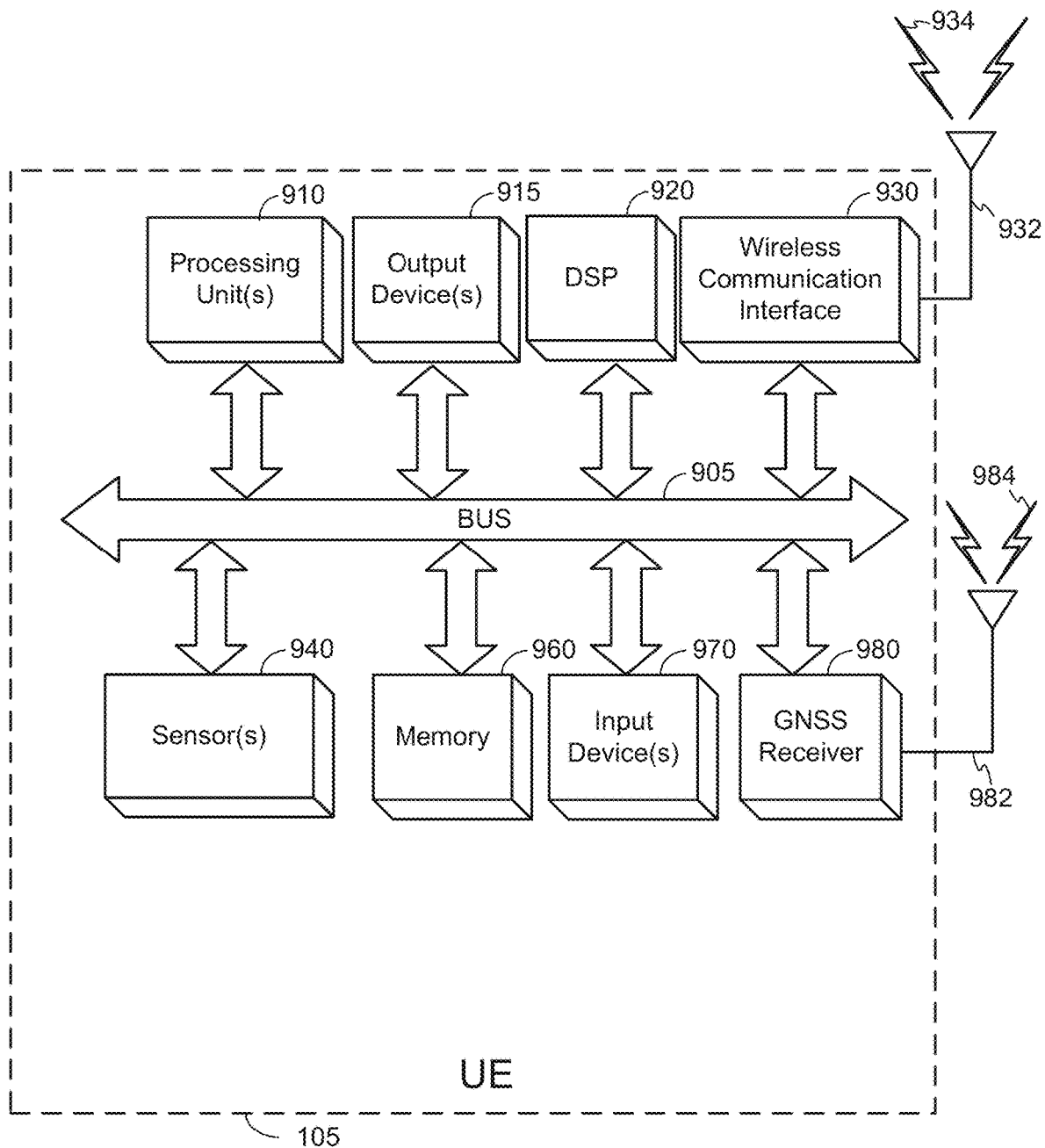
FIG. 9 is an example of a UE that can implement the disclosed techniques.

FIG. 8 is a flow diagram illustrating a method 800 of determining a position of the UE, according to examples of the present disclosure. According to some examples, functionality of one or more blocks illustrated in FIG. 8 may be performed by a mobile device including a UE (e.g., UE 105). Means for performing these functions may include software and/or hardware components of UE 105, as illustrated in FIG. 9 and described in more detail below.

At block 810, the functionality includes receiving, at the mobile device, assistance data from a location server. The assistance data can identify a plurality of candidate cells with which the UE can measure one or more position reference signals (PRS) to support a position measurement operation of the UE. The location server may include, for example, LMF 220. Specifically, as described in FIG. 6C-FIG. 6E, assistance data 610 can identify a reference cell and a plurality of neighboring cells for UE 105. The neighboring cells can include candidate cells from which UE can measure the PRS to measure a PRS measurement, such as time-of-arrival (TOA), which can be compared with the TOA obtained from measuring the PRS with the reference cell to determine RSTDs. The assistance data may include other information, including the CP length (ECP/NCP), the subframe offset and number of consecutive subframes of PRS symbols sent by each cell, etc. In some examples, assistance data may also indicate which of the cells transmit MBSFN subframes including MBMS/control data, and the subframe numbers of the MBSFN subframes. Means for performing the functions at block 810 may comprise a bus 905, processing unit(s) 910, wireless communication interface 930, memory 960, and and/or software components of UE 105 as illustrated in FIG. 9 and described in more detail below.

At block 820, the functionality includes classifying, at the mobile device, the plurality of candidate cells into a first group of candidate cells and a second group of candidate cells, wherein the classification is based on whether a candidate cell transmits PRS symbols in one or more multimedia broadcast single frequency network (MBSFN) subframes in a positioning occasion, and based on a cyclic prefix (CP) length (ECP or NCP) of the PRS symbols being transmitted by the candidate cell in the positioning occasion.

Specifically, referring to FIG. 6A and FIG. 6B, UE 105 can obtain, from SIB 2 and SIB 13, information that indicate the subframe numbers of the MBSFN subframes that carry MBMS symbols and control information for the MBSFN. In some examples, assistance data received in block 810 can also provide the subframe numbers of the MBSFN subframe. The UE can then generate a data structure, such as data structure 630 of FIG. 6F, that stores a mapping between candidate cells (cells A, B, C, and D), their PRS subframe numbers, MBSFN subframe numbers, and CP length. Based on the mapping information of data structure 630 as well as predetermined classification criteria, the UE can classify the candidate cells into two cell groups, such as cell groups 502 and 504 of FIG. 5. In some examples, the first group of candidate cells may include cells that transmit PRS symbols only in MBSFN subframes, and the PRS symbols may include ECP, or a mixture of ECP and NCP. The second group of candidate cells may include cells that transmit PRS symbols in NCP, including cells that belong to the MBSFN but transmits PRS symbols in a mixture of MBSFN subframes and non-MBSFN subframe (e.g., subframe zero) in a positioning occasion, as well as cells that do not belong to the MBSFN and hence transmit PRS symbols in non-MBSFN subframe in the positioning occasion.

Means for performing the functions at block 820 may comprise bus 905, processing unit(s) 910, memory 960, and/or other hardware and/or software components of UE 105 as illustrated in FIG. 9 and described in more detail below.

At block 830, the functionality includes selecting, based on one or more predetermined criteria, one of the first group or the second group of candidate cells to measure the one or more PRS in a current positioning occasion. The predetermined criteria may include, for example, performance metrics, or whether the one or more PRS are performed with a particular group in a previous occasion.

Specifically, one performance metric can be based on the reliability of PRS measurements with the candidate cells. As described above in FIG. 7A, in the assistance data, the neighboring cells can be listed and sorted in a decreasing order of priority for measurements. A neighboring cell listed as a higher priority cell (based on the order of the cells in the list) in the assistance data may reflect that PRS measurement with that cell is more reliable, hence there is a higher priority to perform the PRS measurement with that cell, compared with a neighboring cell listed as a lower priority cell. The UE can assign a priority score to each cell based on the cell's priority as reflected by the cell's order in the list. The UE can then compute an overall priority score (e.g., by averaging the priority scores) for each cell group. The UE can then select the candidate cell group having a higher overall priority score to measure the PRS.

In another example, the performance metric can be based on a quality of signal received from the cells. Specifically, as described in FIG. 7B, the UE can measure a signal quality of the PRS based on, for example, reference signal receive power (RSRP), received signal strength indication (RSSI), etc. The UE can determine an overall signal quality of the cells for each candidate cell group based on, for example, computing an average RSRP/RSSI measurement result for each candidate cell group, and can select the candidate cell group that provides a higher overall signal quality to perform the PRS measurement.

In some examples, the UE can also perform the selection of the candidate cell group following a multi-stage approach. In a first stage, the UE can select between the first group and the second group based on the overall priority in each group. The UE can then determine whether performing PRS measurements with the selected group may lead to a less accurate position determination than with the non-selected group. The determination can be based on, for example, the selected group including far fewer cells than the non-selected group, and therefore providing fewer RSTD results to refine the location determination result. If the UE determines performing PRS measurements with the group selected based on the overall priority may lead to a less accurate position determination than with the non-selected group, the UE can perform signal quality measurements (e.g., RSSI, RSRP) with the cells in both groups, and select the group which provides the higher overall signal quality. The group selected based on the higher overall signal quality may be the same or different from the group selected based on the higher overall priority, and the group selection based on overall signal quality can overrule the group selection based on overall priority.

In some examples, the UE may determine that the group selection at the end of the two-stage approach (based on overall priority, and then based on overall signal quality), does not identify a cell group that improves the location determination versus that other cell group. In such case, the UE may perform PRS measurements alternately between the first cell group and the second cell group in each positioning occasion. In such a case, the selection of one cell group to perform PRS measurement in one positioning occasion will be based on that cell group not being selected in a prior positioning occasion.

Means for performing the functions at block 830 may comprise bus 905, processing unit(s) 910, wireless communication interface 930, memory 960, and and/or software components of UE 105 as illustrated in FIG. 9 and described in more detail below.

At block 840, the functionality includes measuring, by the mobile device, the one or more PRS with the selected one of the first group or the second group of candidate cells in the current positioning occasion to measure PRS measurements. Specifically, based on the CP length of the PRS symbols of the selected cell group (e.g., NCP or ECP), the UE can adapt a CP configuration for its digital signal processor to recover PRS symbols from the selected cell group. For example, in a case where the selected cell group transmits PRS symbols having NCP, the digital signal processor can skip the first 160 samples received in the first symbol period and the first 144 samples received in other symbol periods representing the NCP, whereas in a case where the selected cell group transmits PRS symbols having ECP, the digital signal processor can skip the first 512 samples received in each symbol period representing the ECP. The digital signal processor can then perform processing of the subsequent 2048 samples in a symbol period to recover the PRS symbols. The processing may include Fast Fourier Transform operation, descrambling operation, rotation, DC compensation, followed by inverse Fast Fourier Transform operation. The UE can then measure the TOAs of the recovered PRS symbols. The UE can then determine RSTDs based on the TOAs for that positioning occasion, and determine a position of UE 105 based on the RSTDs and known positions of the base stations of cell group 504.

In some examples, the UE may not measure the PRS with the non-selected cell group, or do not include the PRS measurements with the non-selected cell group in determining the position of the UE. In some examples. In some examples, the UE may measure the PRS with both cell groups but using the CP configuration for the selected cell, and then determine the position of the UE based on a weighted combination of the PRS measurement results from the selected cell group and the non-selected cell group, with the PRS measurement result from the selected cell group assigned a larger weight than the non-selected cell group.

Means for performing the functions at block 840 may comprise bus 905, processing unit(s) 910, wireless communication interface 930, memory 960, and/or software components of UE 105 as illustrated in FIG. 9 and described in more detail below.

FIG. 9 illustrates an embodiment of a UE 105, which can be utilized as described herein above (e.g., in association with FIGS. 1-8). For example, the UE 105 can perform one or more of the functions of method 800 of FIG. 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 9, some embodiments may have a separate DSP 920, depending on desired functionality. Location determination and/or other determinations based on wireless communication may be provided in the processing unit(s) 910 and/or wireless communication interface 930 (discussed below). The UE 105 also can include one or more input devices 970, which can include without limitation a touch screen, a touch pad, microphone, button(s), dial(s), switch(es), and/or the like; and one or more output devices 915, which can include without limitation a display, light emitting diode (LED), speakers, and/or the like.

The UE 105 might also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMax device, cellular communication facilities), and/or the like, which may enable the UE 105 to communicate via the networks described above with regard to FIG. 1. The wireless communication interface 930 may permit data to be communicated with a network, eNBs, gNBs, and/or other network components, computer systems, and/or any other electronic devices described herein. The communication can be carried out via one or more wireless communication antenna(s) 932 that send and/or receive wireless signals 934.

Depending on desired functionality, the wireless communication interface 930 may comprise separate transceivers to communicate with base stations (e.g., eNBs and gNBs) and other terrestrial transceivers, such as wireless devices and access points. Wireless communication interface 930 may support communication with various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. 5G, LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN. Wireless communication interface 930 may also support a Fifth Generation (5G) wireless network (also referred to as New Radio (NR) wireless network). Wireless communication interface 930 can also support networks of various transmission types, as a Multimedia Broadcast multicast service Single Frequency Network (MBSFN), a unicast network, etc.

The UE 105 can further include sensor(s) 940. Such sensors may comprise, without limitation, one or more inertial sensors (e.g., accelerometer(s), gyroscope(s), and or other IMUs), camera(s), magnetometer(s), altimeter(s), microphone(s), proximity sensor(s), light sensor(s), and the like, some of which may be used to complement and/or facilitate the position determination described herein.

Embodiments of the UE 105 may also include a GNSS receiver 980 capable of receiving signals 984 from one or more GNSS satellites (e.g., SVs 110) using an GNSS antenna 982. Such positioning can be utilized to complement and/or incorporate the techniques described herein. The GNSS receiver 980 can extract a position of the UE 105, using conventional techniques, from GNSS SVs of a GNSS system, such as Global Positioning System (GPS), Galileo, Glonass, Compass, Quasi-Zenith Satellite System (QZSS) over Japan, Indian Regional Navigational Satellite System (IRNSS) over India, Beidou over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 105 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the UE 105 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by the UE 105 (and/or processing unit(s) 910 or DSP 920 within UE 105). In an aspect, then, such code and/or instructions can be used to configure and/or adapt a general purpose computer (or other device) to perform one or more operations in accordance with the described methods.

Figure 10:
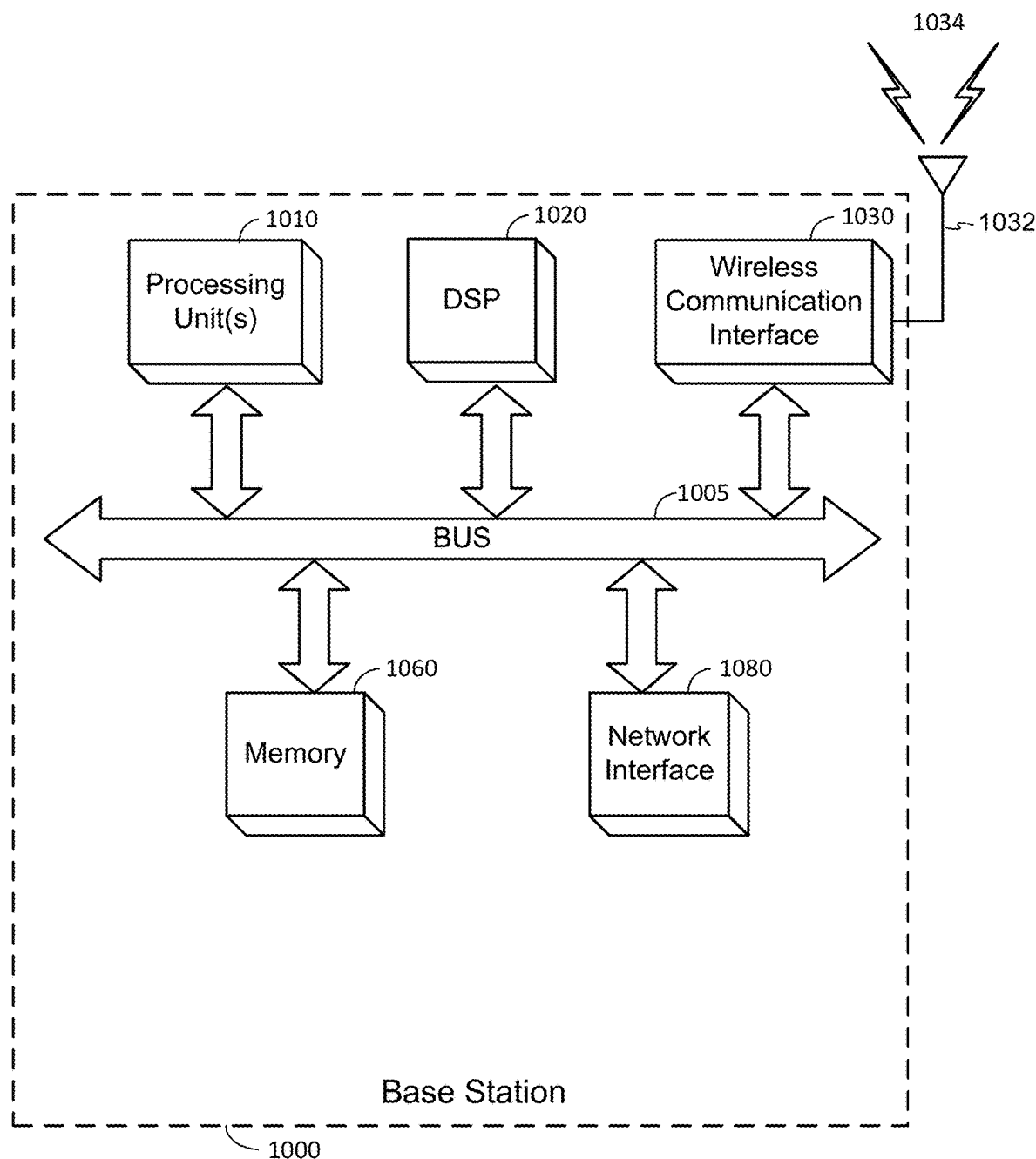
FIG. 10 is an example of a base station that can implement the disclosed techniques.

FIG. 10 illustrates an embodiment of a base station 1000, which can be utilized as described herein above. For example, base station 1000 can perform one or more of the functions to support method 800 of FIG. 8. It should be noted that FIG. 10 is meant only to provide a generalized illustration of various components, any or all of which may be utilized as appropriate. In some embodiments, the base station 1000 may correspond to an LMF 220, a gNB 210, an ng-eNB 210-3 as described herein above.

The base station 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 10, some embodiments may have a separate Digital Signal Processor (DSP) 1020, depending on desired functionality. Location determination and/or other determinations based on wireless communication may be provided in the processing unit(s) 1010 and/or wireless communication interface 1030 (discussed below).

The base station 1000 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, cellular communication facilities), and/or the like, which may enable the base station 1000 to communicate as described herein. The wireless communication interface 1030 may permit data and signaling to be communicated (e.g., transmitted and received) UEs, other base stations (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

Wireless communication interface 1030 may support communication with various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. 5G, LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN. Wireless communication interface 930 may also support a Fifth Generation (5G) wireless network (also referred to as New Radio (NR) wireless network). Wireless communication interface 930 can also support networks of various transmission types, as a Multimedia Broadcast multicast service Single Frequency Network (MBSFN), a unicast network, etc.

Base station 1000 may also include a network interface 1080, which can include support of wireline communication technologies. Network interface 1080 may include a modem, network card, chipset, and/or the like. Network interface 1080 may include one or more input and/or output communication interfaces to permit data to be exchanged with a network, communication network servers, computer systems, and/or any other electronic devices described herein.

In many embodiments, base station 1000 will further comprise a memory 1060. Memory 1060 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

Memory 1060 of the base station 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by base station 1000 (and/or processing unit(s) 1010 or DSP 1020 within base station 1000). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

The invention claimed is:

1. A method, on a user equipment (UE), for performing position measurement in a wireless communication network, the method comprising:
    receiving assistance data from a location server, wherein the assistance data identify a plurality of candidate cells with which the UE can measure one or more position reference signals (PRS) to support a position measurement operation of the UE;
    classifying the plurality of candidate cells into a first group of candidate cells and a second group of candidate cells, wherein the classification is based on whether a candidate cell transmits PRS symbols in one or more multimedia broadcast single frequency network (MBSFN) subframes in a positioning occasion, and based on a cyclic prefix (CP) length of the PRS symbols being transmitted by the candidate cell in the positioning occasion;
    selecting, based on one or more predetermined criteria, one of the first group or the second group of candidate cells to measure the one or more PRS in the positioning occasion; and
    measuring the one or more PRS from the selected one of the first group or the second group of candidate cells in the positioning occasion to measure PRS measurements.

2. The method of claim 1, wherein the first group of candidate cells includes cells that transmit the PRS symbols having extended cyclic prefix (ECP) only in MBSFN subframes; and
    wherein the second group of candidate cells includes cells that transmit the PRS symbols having normal cyclic prefix (NCP) in non-MBSFN frames.

3. The method of claim 1, further comprising:
    receiving, from one or more of the candidate cells, Information Block Type 2 (SIB2) messages,
    wherein the SIB2 messages include MBSFN configuration information indicating whether a candidate cell transmits MBSFN subframes and their subframe numbers; and
    wherein the plurality of candidate cells is classified into the first group and the second group based on the MBSFN configuration information included in the SIB2 messages.

4. The method of claim 1, wherein the assistance data include MBSFN configuration information of the candidate cells; and
    wherein the plurality of candidate cells is classified into the first group and the second group based on the MBSFN configuration information included in the assistance data.

5. The method of claim 1, wherein the assistance data include identifiers of the plurality of candidate cells arranged in a list following a predetermined order;
    wherein the method further comprises:
        assigning a priority score to each of the plurality of candidate cells based on the candidate cell's order in the list;
        computing a first combined priority score of the first group based on the priority score assigned to each candidate cell classified into the first group; and
        computing a second combined priority score of the second group based on the priority score assigned to each candidate cell classified into the first group; and
        wherein the one of the first group or the second group of candidate cells is selected based on the first combined priority score and the second combined priority score.

6. The method of claim 5, wherein the first combined priority score is computed based on averaging the priority score of each candidate cell classified into the first group; and
    wherein the second combined priority score is computed based on averaging the priority score of each candidate cell classified in the second group.

7. The method of claim 5, further comprising:
    measuring a signal quality of the one or more PRS with at least some of the plurality of candidate cells,
    wherein the one of the first group or the second group of candidate cells is selected based on the signal quality results of the candidate cells.

8. The method of claim 7, further comprising:
    selecting the first group of candidate cells based on the first combined priority score and the second combined priority score; and
    responsive to determining the PRS measurements with the first group of candidate cells are potentially less accurate than the PRS measurements with the second group of candidate cells:
        measuring a signal quality of the one or more PRS symbols with the at least some of the plurality of candidate cells;
        based on the signal quality results, determining a first overall signal quality for the first group and a second overall signal quality for the second group; and
        selecting one of the first group or the second group based on the first overall signal quality and the second overall signal quality.

9. The method of claim 8, wherein the determination that the PRS measurements with the first group of candidate cells are potentially less accurate than the PRS measurements with the second group of candidate cells is based on the first group including fewer candidate cells than the second group.

10. The method of claim 8, wherein the at least some of the plurality of candidate cells comprise intra-frequency cells.

11. The method of claim 8, wherein the signal quality results comprise at least one of: reference signal receive power (RSRP) measurements, or received signal strength indication (RSSI).

12. The method of claim 1, further comprising:
    measuring the one or more PRS from the first group of candidate cells in a first PRS occasion to measure first PRS measurements; and
    measuring the one or more PRS from the second group of candidate cells in a second PRS occasion to obtain measure second PRS measurements,
    wherein the position of the UE is determined based on the first PRS measurements and the second PRS measurements.

13. The method of claim 1, wherein measuring the one or more PRS from the selected one of the first group or the second group of candidate cells in the positioning occasion comprises, in each symbol period:

based on the CP length of the selected one of the first group or the second group of candidate cells, skipping a number of samples of radio signals received in the symbol period; performing processing on the remaining samples of radio signals received in the symbol period to recover a PRS symbol; and determining a time of arrival (TOA) of the recovered PRS symbol.

14. The method of claim 13, further comprising:

measuring the one or more PRS from the non-selected one of the first group or the second group of candidate cells in the positioning occasion based on the CP length of the selected one of the first group or the second group of candidate cells; and determining a position of the UE based on a weighted combination of the PRS measurements with the selected one of the first group or the second group of candidate cells and the PRS measurements with the non-selected one of the first group or the second group of candidate cells.

15. The method of claim 13, further comprising:

determining a reference signal time difference (RSTD) based on the TOA of a PRS symbol from a reference cell and the TOAs of the PRS symbols from the selected one of the first group or the second group of candidate cells; and determining a position of the UE based on the RSTD, a known position of the reference cell, and known position of the selected one of the first group or the second group of candidate cells.

16. A user equipment (UE), for performing position measurement in a wireless communication network, the UE comprising:

memory;

a wireless communication interface; and a processing unit, communicatively coupled to the memory and the wireless communication interface, the processing unit configured to:

receive assistance data from a location server, wherein the assistance data identify a plurality of candidate cells with which the UE can measure one or more position reference signals (PRS) to support a position measurement operation of the UE;

classify the plurality of candidate cells into a first group of candidate cells and a second group of candidate cells, wherein the classification is based on whether a candidate cell transmits PRS symbols in one or more multimedia broadcast single frequency network (MBSFN) subframes in a positioning occasion, and based on a cyclic prefix (CP) length of the PRS symbols being transmitted by the candidate cell in the positioning occasion;

select, based on one or more predetermined criteria, one of the first group or the second group of candidate cells to measure the one or more PRS in the positioning occasion; and measure the one or more PRS from the selected one of the first group or the second group of candidate cells in the positioning occasion to measure PRS measurements.

17. The UE of claim 16, wherein the first group of candidate cells includes cells that transmit the PRS symbols having extended cyclic prefix (ECP) only in MBSFN subframes; and wherein the second group of candidate cells includes cells that transmit the PRS symbols having normal cyclic prefix (NCP) in non-MBSFN frames.

18. The UE of claim 16, wherein the processing unit is further configured to receive, from one or more of the candidate cells, Information Block Type 2 (SIB2) messages;

wherein the SIB2 messages include MBSFN configuration information indicating whether a candidate cell transmits MBSFN subframes and their subframe numbers; and wherein the plurality of candidate cells is classified into the first group and the second group based on the MBSFN configuration information included in the SIB2 messages.

19. The UE of claim 16, wherein the assistance data include MBSFN configuration information of the candidate cells; and wherein the plurality of candidate cells is classified into the first group and the second group based on the MBSFN configuration information included in the assistance data.

20. The UE of claim 16, wherein the assistance data include identifiers of the plurality of candidate cells arranged in a list following a predetermined order;

wherein the processing unit is further configured to:

assign a priority score to each of the plurality of candidate cells based on the candidate cell's order in the list;

compute a first combined priority score of the first group based on the priority score assigned to each candidate cell classified into the first group; and compute a second combined priority score of the second group based on the priority score assigned to each candidate cell classified into the first group; and wherein the one of the first group or the second group of candidate cells is selected based on the first combined priority score and the second combined priority score.

21. The UE of claim 20, wherein the first combined priority score is computed based on averaging the priority score of each candidate cell classified into the first group; and wherein the second combined priority score is computed based on averaging the priority score of each candidate cell classified in the second group.

22. The UE of claim 20, wherein the processing unit is further configured to measure a signal quality of the one or more PRS with at least some of the plurality of candidate cells; and wherein the one of the first group or the second group of candidate cells is selected based on the signal quality results of the candidate cells.

23. The UE of claim 22, wherein the processing unit is further configured to:

select the first group of candidate cells based on the first combined priority score and the second combined priority score; and responsive to determining the PRS measurements with the first group of candidate cells are potentially less accurate than the PRS measurements with the second group of candidate cells:

measure a signal quality of the one or more PRS with the at least some of the plurality of candidate cells;

based on the results of the signal quality results, determine a first overall signal quality for the first group and a second overall signal quality for the second group; and select one of the first group or the second group based on the first overall signal quality and the second overall signal quality.

24. The UE of claim 23, wherein the determination that the PRS measurements with the first group of candidate cells are potentially less accurate than the PRS measurements with the second group of candidate cells is based on the first group including fewer candidate cells than the second group.

25. The UE of claim 23, wherein the at least some of the plurality of candidate cells comprise intra-frequency cells.

26. The UE of claim 23, wherein the signal quality results comprise at least one of: reference signal receive power (RSRP) measurements, or received signal strength indication (RSSI).

27. The UE of claim 16, wherein the processing unit is further configured to:
measure the one or more PRS from the first group of candidate cells in a first PRS occasion to measure first PRS measurements; and
measure the one or more PRS from the second group of candidate cells in a second PRS occasion to obtain measure second PRS measurements; and
wherein the position of the UE is determined based on the first PRS measurements and the second PRS measurements.

28. The UE of claim 16, wherein measuring the one or more PRS from the selected one of the first group or the second group of candidate cells in the positioning occasion comprises the processing unit being further configured to, in each symbol period:
based on the CP length of the selected one of the first group or the second group of candidate cells, skip a number of samples of radio signals received in the symbol period; performing processing on the remaining samples of radio signals received in the symbol period to recover a PRS symbol; and
determine a time of arrival (TOA) of the recovered PRS symbol.

29. The UE of claim 28, wherein the processing unit is further configured to:
measure the one or more PRS from the non-selected one of the first group or the second group of candidate cells in the positioning occasion based on the CP length of the selected one of the first group or the second group of candidate cells; and
determine a position of the UE based on a weighted combination of the PRS measurements with the selected one of the first group or the second group of candidate cells and the PRS measurements with the non-selected one of the first group or the second group of candidate cells.

30. The UE of claim 28, wherein the processing unit is further configured to:
determine a reference signal time difference (RSTD) based on the TOA of a PRS symbol from a reference cell and the TOAs of the PRS symbols from the selected one of the first group or the second group of candidate cells; and
determine a position of the UE based on the RSTD, a known position of the reference cell, and known position of the selected one of the first group or the second group of candidate cells.

31. An apparatus being part of a user equipment (UE) for performing position measurement in a wireless communication network, comprising:
means for receiving assistance data from a location server, wherein the assistance data identify a plurality of candidate cells with which the UE can measure one or more position reference signals (PRS) to support a position measurement operation of the UE;
means for classifying the plurality of candidate cells into a first group of candidate cells and a second group of candidate cells, wherein the classification is based on whether a candidate cell transmits PRS symbols in one or more multimedia broadcast single frequency network (MBSFN) subframes in a positioning occasion, and based on a cyclic prefix (CP) length of the PRS symbols being transmitted by the candidate cell in the positioning occasion;
means for selecting, based on one or more predetermined criteria, one of the first group or the second group of candidate cells to measure the one or more PRS in the positioning occasion; and
means for measuring the one or more PRS from the selected one of the first group or the second group of candidate cells in the positioning occasion to measure PRS measurements.

32. A non-transitory computer readable comprising instructions that, when executed by a processor, cause the processor to:
receive assistance data from a location server, wherein the assistance data identify a plurality of candidate cells with which the UE can measure one or more position reference signals (PRS) to support a position measurement operation of the UE;
classify the plurality of candidate cells into a first group of candidate cells and a second group of candidate cells, wherein the classification is based on whether a candidate cell transmits PRS symbols in one or more multimedia broadcast single frequency network (MBSFN) subframes in a positioning occasion, and based on a cyclic prefix (CP) length of the PRS symbols being transmitted by the candidate cell in the positioning occasion;
select, based on one or more predetermined criteria, one of the first group or the second group of candidate cells to measure the one or more PRS in the positioning occasion; and
measure the one or more PRS from the selected one of the first group or the second group of candidate cells in the positioning occasion to measure PRS measurements.

* * * * *